US011722999B2

(12) United States Patent
Sarin

(10) Patent No.: US 11,722,999 B2
(45) Date of Patent: *Aug. 8, 2023

(54) COMMUNICATION CHANNEL MERGING SYSTEM

(71) Applicant: PAYPAL, INC., San Jose, CA (US)

(72) Inventor: Pankaj Sarin, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,106

(22) Filed: Nov. 30, 2021

(65) Prior Publication Data

US 2022/0086809 A1 Mar. 17, 2022

Related U.S. Application Data

(63) Continuation of application No. 16/926,049, filed on Jul. 10, 2020, now Pat. No. 11,259,283.

(51) Int. Cl.
*H04W 72/04* (2023.01)
*H04W 76/25* (2018.01)

(52) U.S. Cl.
CPC .......... *H04W 72/04* (2013.01); *H04W 76/25* (2018.02)

(58) Field of Classification Search
CPC ..... H04W 72/04; H04W 76/25; H04W 76/15; H04W 76/20; H04W 72/0406; H04L 51/046; H04L 51/04; H04L 51/36; H04L 65/1096; H04L 65/4015; H04L 65/4007; H04M 2203/256; H04M 3/5183; H04M 3/5191

See application file for complete search history.

(56) References Cited

U.S. PATENT DOCUMENTS

| | | | |
|---|---|---|---|
| 7,882,217 B2 | 2/2011 | Katzir | |
| 8,213,434 B2* | 7/2012 | Gao | H04L 67/54 |
| | | | 709/227 |
| 8,516,500 B2* | 8/2013 | Hebeler, Jr. | H04L 43/062 |
| | | | 705/52 |
| 9,443,216 B2 | 9/2016 | Singh et al. | |
| 9,736,308 B1 | 8/2017 | Wu et al. | |
| 10,237,406 B2* | 3/2019 | Paugam | H04M 3/5175 |
| 10,749,912 B2 | 8/2020 | Hu et al. | |
| 10,911,396 B2 | 2/2021 | Nair et al. | |

(Continued)

*Primary Examiner* — Ahmed Elallam
(74) *Attorney, Agent, or Firm* — Haynes and Boone, LLP

(57) ABSTRACT

A communication channel merging system detects that a first communication session that is provided via a first communication channel between a first user and a first service provider is concurrent with a second communication session that is provided via a second communication channel between the first user and a second service provider. The system then generates a user score based on information associated with the first and second communication sessions and determines that the user score satisfies a condition that causes the first and second communication sessions to be merged into a merged communication session. The system generates a first channel score for the first communication channel and a second channel score for the second communication channel and determines based on those channel scores that the first communication channel should provide the merged communication session. The system directs the merged communication session to be provided on the first communication channel.

20 Claims, 15 Drawing Sheets

(56) References Cited

U.S. PATENT DOCUMENTS

| | | |
|---|---|---|
| 11,259,283 B2 * | 2/2022 | Sarin .................... H04W 72/04 |
| 2020/0014642 A1 | 1/2020 | Sidi et al. |
| 2021/0144253 A1 | 5/2021 | Sheshaiahgari et al. |

\* cited by examiner

COMMUNICATION CHANNEL MERGING SYSTEM

CROSS REFERENCE TO RELATED APPLICATION

The present invention is a Continuation of U.S. patent application Ser. No. 16/926,049, filed Jul. 10, 2020, the disclosure of which is incorporated herein by reference in its entirety.

TECHNICAL FIELD

The present disclosure generally relates to communication channel systems and more particular to a communication channel merging system that merges communication sessions on communications channels between communication interfaces and communication providers.

BACKGROUND

Service providers such as payment service providers, merchants, retailers, and content providers may provide a customer service system to customers such that customers may inquire or receive support to questions or issues that customers may be experiencing in relation to a product, a service, or a system of the service provider with which the customer is interacting. Customer service systems may include several support platforms including contact centers where a customer may interact with a customer service representative, chat bots, interactive voice response (IVR) systems, and/or a customer service website. Each of these support platforms may have one or more possible channels of interaction between a customer and a customer service representative or other support. For example, through a messaging interface, provided by a customer service web page or application, the customer may interact with one or more message provider services such as artificial intelligence (AI) programs (e.g., a bot) or a live customer service representative, using messaging interfaces such as an instant message platform, email, asynchronous messaging, and/or text messaging. In another example, the customer may attempt to connect to a customer representative via an IVR system to engage in a verbal conversation. Live customer support via a messaging system or an IVR system is typically preferred in handling customer support. However, contact centers employing customer representatives are expensive to provide, and may become overwhelmed with customer interactions for certain events or times of day, resulting in a lessened customer experience in resolving the customer's issue due to wait times.

As such, while waiting for a live representative on one support platform via a communication channel, the customer may attempt to establish an additional communication session with a representative on another support platform via a different communication channel. For example, while a customer is on hold for a live representative on an IVR system, the customer may initiate a chat session with a messaging platform (e.g., an agent chat platform, a bot platform, etc.) to resolve that user's issue or a different issue. By being on multiple communication channels simultaneously or serially but essentially being on multiple communication channels at the same time, multiple system resources are utilized, which adds to incremental contact servicing costs.

Figure 1:
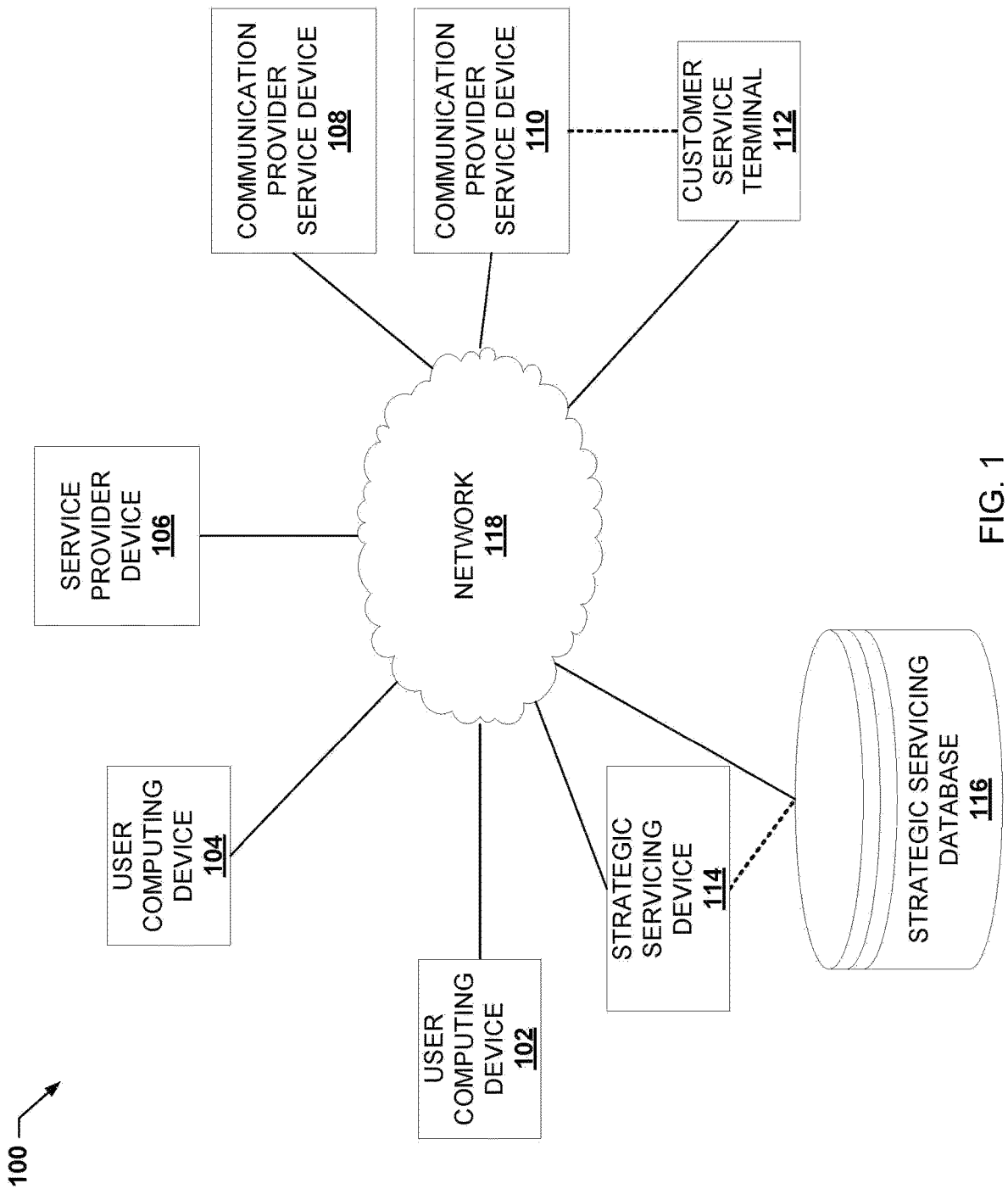
FIG. 1 is a schematic view illustrating an embodiment of the communication channel merging system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for a communication channel merging system that merges communication sessions on various communication channels. As discussed above, users of a customer support system may often try to resolve their inquires via multiple communication sessions that are on various communication channels. For example, a user may initiate a call with a customer service call center to resolve an issue and then activate a communication session on a messaging system to resolve the same issue or a different issue while the user is on hold with the customer service call center. Having multiple communication sessions on various communication channels for the same user may be expensive in terms of network resources being utilized and cost of customer service representatives or platforms that service the user's various inquiries. As such, the systems and methods of the present disclosure provide a communication channel merging system that detects situations where multiple communication channels are concurrently active for a given user. The communication channel merging system, calculates a user score based on information about the user, the communication channels, intents of the communication sessions, and/or other information and determines whether the user score satisfies a merge condition. If the merge condition is satisfied, the communication channel merging system may merge the communication sessions that are provided on the various communication channels into a merged communication session.

The merged communication session may be a first communication session and/or any other communication session combined with a second communication session by adding some or all of the first communication session information with the second communication session information to create merged communication session information that is associated with the second communication session. No other changes may occur to the second communication session that receives the first communication session information (e.g., a communication session identifier for the second communication session may be maintained). In other embodiments, the merged communication session may be a new, third communication session that is created by combining at least a portion of the first communication session information with at least a portion of the second communication session information. The third communication session may have a third communication session identifier that is different than a first communication session identifier for the first communication session and a second communication session identifier.

The communication channel merging system may also determine on which communication channel to provide the merged communication session based on channel scores for each active communication channel that are calculated based on information associated with the communication channels, the communication service providers, the user, the intent(s) of the merged communication session, and/or other information. The communication channel merging system may select one of the active communication channels based on the channel scores and provide the merged communication session on one of those channels. In some embodiments, the communication channel merging system may provide a merge channel notification to a user via one or more user computing devices that are on an active communication channel and/or to a customer service representative via a customer service terminal. The merge channel notification may provide an option to the user or customer service representative via a communication interface as to whether to merge the communications sessions on an identified communication channel or not. Once the merged communication session is provided on a selected communication channel such that communications between a user and a customer service provider can be exchanged via that communication channel, the communication channel merging system may terminate that remaining channel(s) on which the merged communication session is not provided. As such, resources usage of a customer service system such as hardware and network resources can be reduced, cost of servicing inquiries, customer service experiences may be improved, as well as other benefits may be realized from the teachings of the present disclosure.

Referring now to FIG. 1, an embodiment of a communication channel merging system 100 is illustrated. The communication channel merging system 100 includes a user computing device 102, a user computing device 104, a service provider device 106, a communication provider service device 108, a communication provider service device 110, a customer service terminal 112, a strategic servicing device 114, and a strategic servicing database 116 in communication of over a network 118. While two user computing devices 102 and 104 are illustrated as being in communication with the communication channel merging system 100, one of skill in the art in possession of the present disclosure will recognize that one or any number of user computing devices may be included the communication channel merging system 100. Furthermore, although only one service provider device 106 and customer service terminal 112 are illustrated as being included in the communication channel merging system 100, one of skill in the art in possession of the present disclosure would recognize that any number of these devices may be included in the communication channel merging system 100 while remaining within the scope of the present disclosure. In an embodiment, the user computing device 102 and/or 104 may be provided by a desktop computing system, a laptop/notebook computing system, a tablet computing system, a mobile phone, a landline phone, a wearable computing device and/or other user computing devices that would be apparent to one of skill in the art in possession of the present disclosure.

The network 118 may be implemented as a single network or a combination of multiple networks. For example, in various embodiments, the network 118 may include the Internet and/or one or more intranets, landline networks, wireless networks, and/or other appropriate types of networks. The network 118 may include a data network, a public switched telephone network, and/or a converged network on which both data communications and voice communications are transmitted.

The service provider device 106 may include a service provider server that may include multiple servers and computing devices (e.g., desktop computing device(s), laptop/notebook computing device(s), tablet computing device(s), mobile phone(s), etc.) for providing a service to a user through the user computing device 102 and/or 104. For example, the service provider device 106 may provide payment services for facilitating online and/or mobile payments between a retailer/merchant and a consumer. In other examples, the service provider device 106 may be an online retailer system configured to present and sell products to a consumer, a gaming system that provides online gaming to a consumer, a content provider system that provides content such as streaming videos to a consumer, a general consumer support system for an organization, a banking system, a social network system, and/or other systems belonging to organizations that require customer support. The service provider device 106 may include one or more servers and systems for providing the services and/or products related to the service provider's business.

The service provider device 106 may provide a communication interface (e.g., a messaging interface, a video conferencing interface, etc.) to the user computing device 102 and/or 104 via a web application. The communication interface may be included at the service provider device 106 or may be provided by a separate communication interface service device that may include multiple servers and computing devices (e.g., desktop computing device(s), laptop/notebook computing device(s), tablet computing device(s), mobile phone(s), etc.) for providing a communication interface service to a user through the user computing device 102 and/or 104. For example, the communication interface service may be provided by PayPal, Inc, Facebook Messenger™, WhatsApp Twitter™, Amazon Alexa™, short message service (SMS) messaging, e-mail, asynchronous messaging, a video/audio conference service, and/or other text messaging services, voice to text services, and/or video/audio services that would be apparent to one of skill in the art in possession of the present disclosure.

The communication channel merging system 100 may include a plurality of communication provider service devices 108 and up to 110. Each communication provider service device 108 and/or up to 110 may include a communication provider service server that may include multiple servers and computing devices (e.g., desktop computing device(s), laptop/notebook computing device(s), tablet computing device(s), mobile phone(s), etc.) for providing a communication provider service to a user through the user computing device 102 and/or 104. The communication provider service device 108 and/or 110 may include a live chat platform (e.g., a message provider service that allows representative to communicate with the user via the messaging interface), an artificial intelligence (AI) platform (e.g., a bot platform where a computer program is configured to communicate with the user via the messaging interface), an asynchronous messaging platform, interactive voice response (IVR) system, an e-mail platform, and/or any other communication platforms voice, audio/visual, and/or text that would be apparent to one of skill in the art in possession of the present disclosure. The bot platform may include, for example, IBM Watson™, Inbenta™, Amazon Lex™, Flamingo™, Snaps™, Google Dialogflow™, Microsoft LUIS™, and/or any other bot platform that may be apparent to one of skill in the art in possession of the present disclosure. The live chat platform may include, for example, Genesys™, LivePerson™, LiveChat™, WebChat™, and/or any other live chat platform that would be apparent to one of skill in the art in possession of the present disclosure.

The communication channel merging system 100 also includes a customer service terminal 112 from which a customer service representative may help to provide customer service. The customer service terminal may include a telephone for voice communications and/or a computing device for receiving information related to a communication session and displaying information, audio feeds, visual feeds, and/or message communications to a customer service representative. As can be seen in the illustrated embodiment, the customer service terminal 112 is in direct communication with the communication provider service device 110. However, it is contemplated that the customer service terminal 112 may include multiple customer service terminals that may be in communication with any of the components of the communication provider service devices 108 and/or up to 110 through the network 118, and provided via other configurations that are envisioned as falling within the scope of the present disclosure.

The communication channel merging system 100 may include a strategic servicing database 116 that may include one or more storage systems that is in communication with the communication channel merging system 100 via the network 118 and/or may be provided in conjunction with any of the server devices provided on the communication channel merging system 100. In various embodiments, the strategic servicing database 116 may include communication channel merging system logs that include error logs about the communication channel merging system 100, configurations of communication channels, user experiences, communication session interaction log (e.g., identifiers, intents, durations, outcomes, etc.) for a communication session, communications (e.g., recordings, messaging exchanges, etc.) made during a communication session between a user and a communication provider service, other user information, user computing device information, and/or any other information of the communication channel merging system 100 discussed below and/or that would be apparent to one of skill in the art in possession of the present disclosure.

Furthermore, the communication channel merging system 100 may include third-party databases that may be in communication with the communication channel system 100 through network 118. The third-party databases may provide third-party data such as social media data, third-party service provider disruptions, credit bureau data, federal compliance and regulatory data, user information associated with a user, and/or other third-party data for providing customer service that would be apparent to one of skill in the art in possession of the present disclosure.

The communication channel merging system 100 may include the strategic servicing device 114. The strategic servicing device 114 may include a communication channel merging server that may include multiple servers and/or computing devices (e.g., desktop computing device(s), laptop/notebook computing device(s), tablet computing device(s), mobile phone(s), etc.) for providing an communication channel merging service to the other devices (e.g., the user computing device 102 and/or 104, the service provider device 106, the communication provider service devices 108 and/or up to 110, the customer service terminal 112, and/or any other device that may be used for the methods and systems discussed below. As discussed in more detail below, the strategic servicing device 114 may integrate, facilitate, and/or otherwise manage the different components of the communication channel merging system 100 such that there is seamless integration of merging communication channels. The strategic servicing device 114 may provide a seamless user experience when establishing a communication session with communication provider service devices 108 and/or 110 in the communication channel merging system 100 as well.

Figure 2:
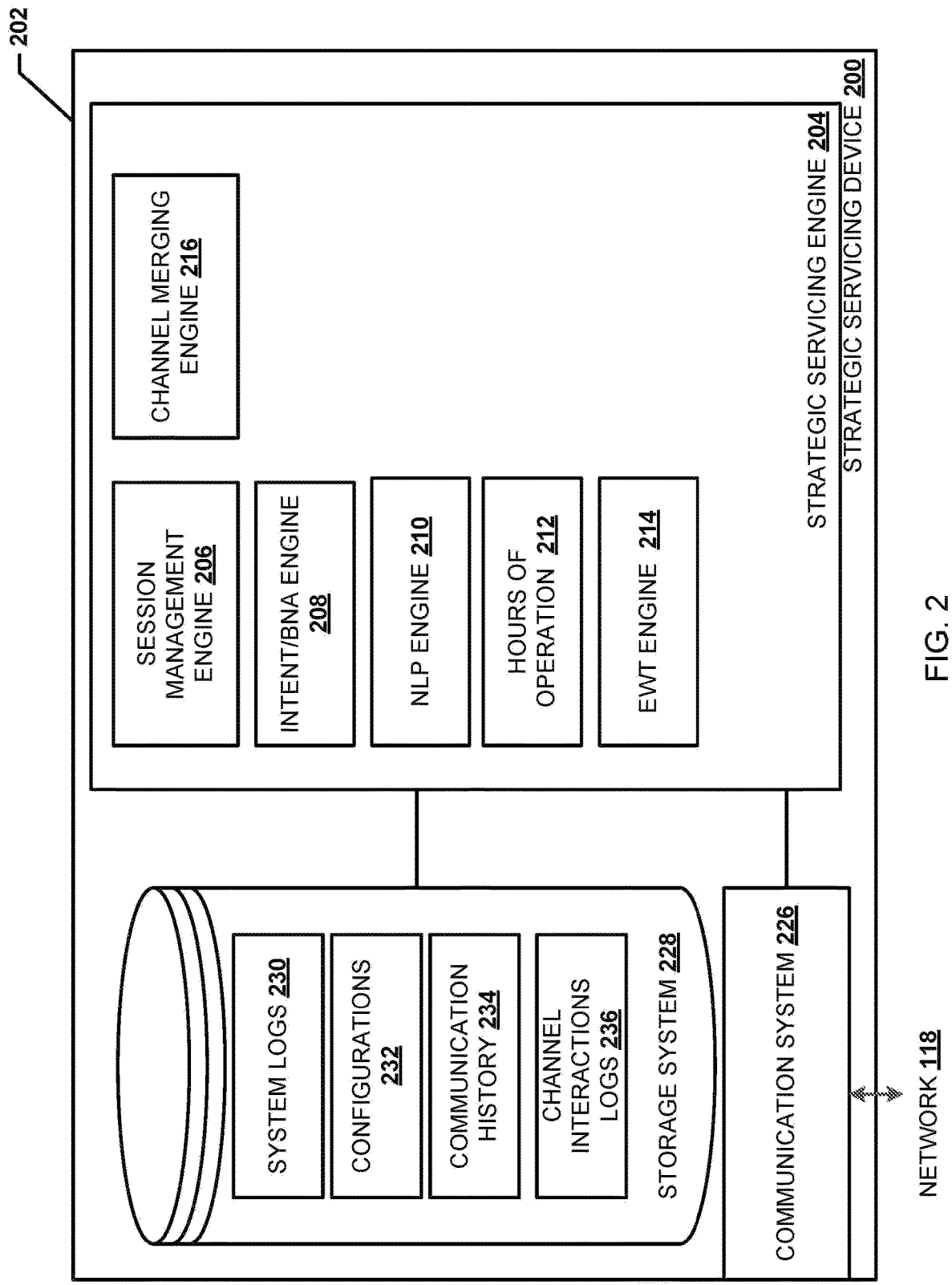
FIG. 2 is a schematic view illustrating an embodiment of a strategic servicing device of the communication channel merging system of FIG. 1.

Referring now to FIG. 2, an embodiment of a strategic servicing device 200 is illustrated. In various embodiments, the strategic servicing device 200 may be provided by Integrated Data Infrastructure (IDI) that may include many capabilities such as, for example, statistical data management and intelligence capabilities (e.g., call Service Level Agreements (SLAs), loss propensity scores, risk scores, Artificial Intelligence (AI)/Machine Learning (ML) models, and other statistical data management functions for the communication channel merging system 100). In an embodiment, the strategic servicing device 200 may be the strategic servicing device 114, discussed above. In the illustrated embodiment, the strategic servicing device 200 includes a chassis 202 that houses the components of the strategic servicing device 200, only some of which are illustrated in FIG. 2. For example, the chassis 202 may house a processing system (not illustrated) and a non-transitory memory system (not illustrated) that includes instructions that, when executed by the processing system, cause the processing system to provide an strategic servicing engine 204 that is configured to perform the functions of the strategic servicing engine 204 and/or the strategic servicing device 200 discussed below. In a specific example, the strategic servicing engine 204 may be software or instructions stored on a computer-readable medium that provides, for example, a communication session management engine 206, an intent/Best Next Action (BNA) engine 208, a Natural Language Processing (NLP) engine 210, an Hours of Operation (HOO) engine 212, an Estimated Wait Time (EWT) engine 214, a channel merging engine 216, and/or provide any of the other functionality that is discussed below.

The chassis 202 may further house a communication system 226 that is coupled to the strategic servicing engine 204 (e.g., via a coupling between the communication system 226 and the processing system) and configured to provide for communication through the network 118 as detailed below. The communication system 226 may be provided by a network Interface Controller (NIC), a wireless communication subsystem (e.g., a WiFi communication subsystem, A BLUETOOTH communication subsystem, a Near Field communication (NFC) subsystem, and/or other wireless communication subsystems known in the art), and/or any other communication components that would be apparent to one of skill in the art in possession of the present disclosure. The chassis 202 may also house a storage system 228 that is coupled to the strategic servicing engine 204 through the processing system. The storage system 228 may include all or a portion of the strategic servicing database 116 of FIG. 1 and may store system logs 230, configurations 232, communication history 234, channel interactions logs 236, and/or any other data and/or instructions that would be apparent to one of skill in the art in possession of the present disclosure. While the storage system 228 has been illustrated as housed in the chassis 202 of the strategic servicing device 200, one of skill in the art will recognize that the storage system 228 may be connected to the strategic servicing engine 204 through the network 118 without departing from the scope of the present disclosure. While a specific strategic servicing device 200 has been illustrated and described, one of skill in the art in possession of the present disclosure will recognize that strategic servicing devices may include other components and/or component configurations for performing conventional functionality, as well as the functionality discussed below, while remaining within the scope of the present disclosure.

Figure 3:
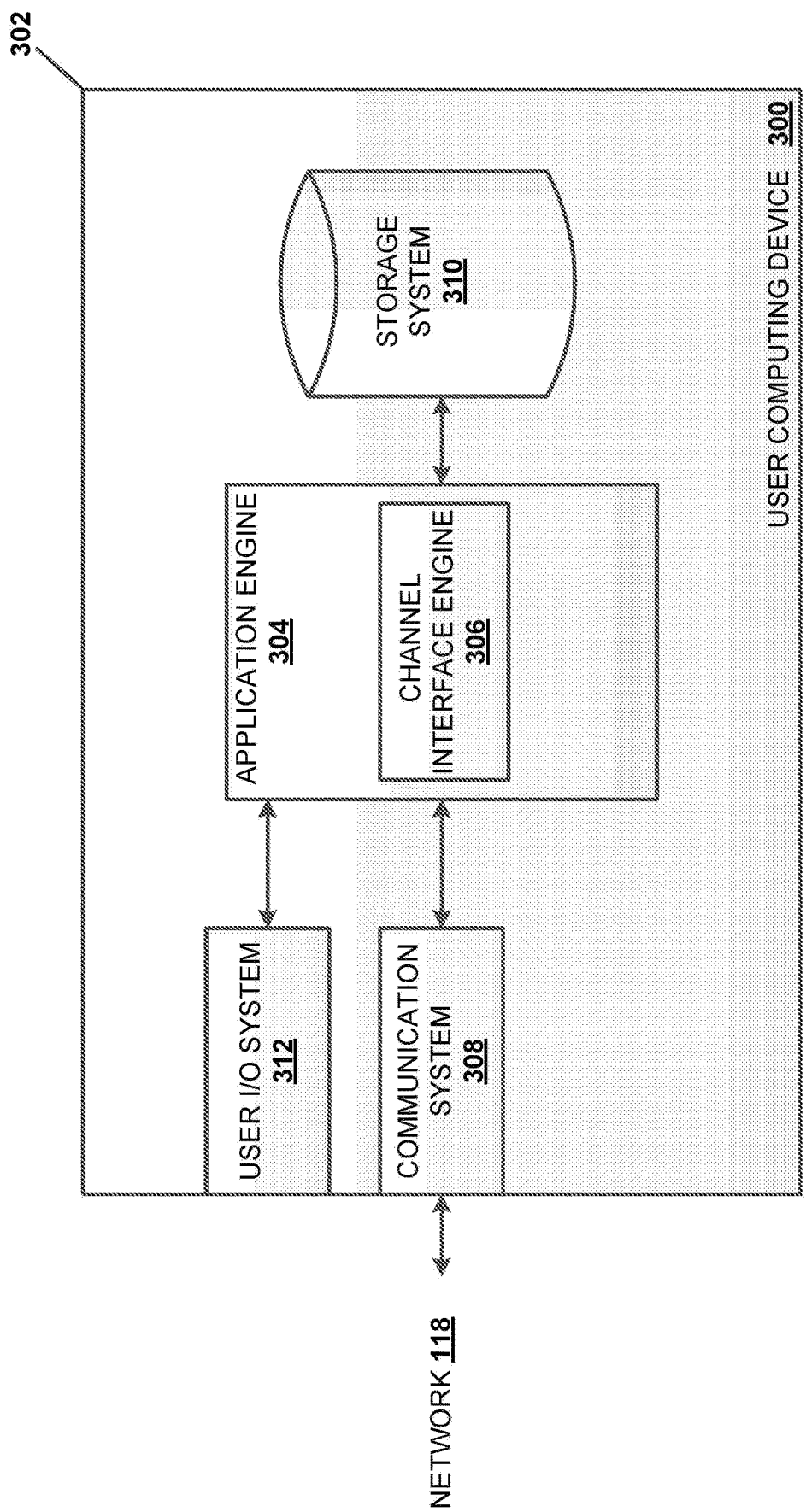
FIG. 3 is a schematic view illustrating an embodiment of a user computing device of the communication channel merging system of FIG. 1.

Referring now to FIG. 3, an embodiment of a user computing device 300 is illustrated that, in some embodiments, may be the user computing device 102 or the user computing device 104 discussed above. As such, in some examples the user computing device 300 may be provided by one or more user computing devices such as desktop computing systems, laptop/notebook computing systems, tablet computing systems, mobile phones, Application Specific Integrated Circuit (ASIC) computing systems, and/or other computing device known in the art, while remaining within the scope of the present disclosure.

In the illustrated embodiment, the user computing device 300 includes a chassis 302 that houses the components of the user computing device 300, only some of which are illustrated in FIG. 3. For example, the chassis 302 may house a processing system (not illustrated) and a non-transitory memory system (not illustrated) that includes instructions that, when executed by the processing system, cause the processing system to provide an application engine 304 that is configured to perform the functions of the application engines and user computing devices discussed below. For example, the application engine 304 may include a web browser and/or a native application that can access a service provided by a service provider device (e.g., the service provider device 106 and/or the communication provider service devices 108-110), as well as provide any of the other functions of the application engines discussed below. The application engine 304 may also include a channel interface engine 306 that is configured to provide a communication channel interface to the user computing device 300, as well as perform any of the other functions of the channel interface engine discussed below.

In various embodiments, the chassis 302 also houses a user input/output (I/O) system 312 that is coupled to the application engine 304 (e.g., via a coupling between the processing system and the user I/O system 312). In an embodiment, the user I/O system 312 include one or more input devices that may be provided by a keyboard input subsystem, a mouse input subsystem, a track pad input subsystem, a touch input display subsystem, an imaging system (e.g., a camera), a microphone, and/or any other input subsystem. The user I/O system 312 include one or more output devices that may be provided by a display subsystem, a haptic feedback subsystem, a speaker subsystem, and/or other output subsystem. In various embodiments, input devices and/or the output devices may be provided by subsystems that are integrated into the user computing device 300 or by subsystems that is coupled directly to the user computing device 300 (e.g., a display device coupled to a desktop computing device by a cabled or wireless connection).

The chassis 302 may further house a communication system 308 that is coupled to the application engine 304 (e.g., via a coupling between the communication system 308 and the processing system) and configured to provide for communication through the network 118 as detailed below. The communication system 308 may be provided by a network Interface Controller (NIC), a wireless communication subsystem (e.g., a WiFi communication subsystem, a BLUETOOTH communication subsystem, a Near Field communication (NFC) subsystem, and/or other wireless communication subsystems known in the art), and/or any other communication components that would be apparent to one of skill in the art in possession of the present disclosure. The chassis 302 may also house a storage system 310 that is coupled to the application engine through the processing system. The storage system 310 may store rules, settings, and/or other data utilized by the application engine 304 and/or the channel interface engine 306 to provide the functionality discussed below. While the storage system 310 has been illustrated as housed in the chassis 302 of the user computing device 300, one of skill in the art will recognize that it may be connected to application engine 304 through the network 118 without departing from the scope of the present disclosure. While a specific user computing device 300 has been illustrated and described, one of skill in the art in possession of the present disclosure will recognize that user computing devices may include other components and/or component configurations for performing conventional functionality, as well as the functionality discussed below, while remaining within the scope of the present disclosure.

Figure 4:
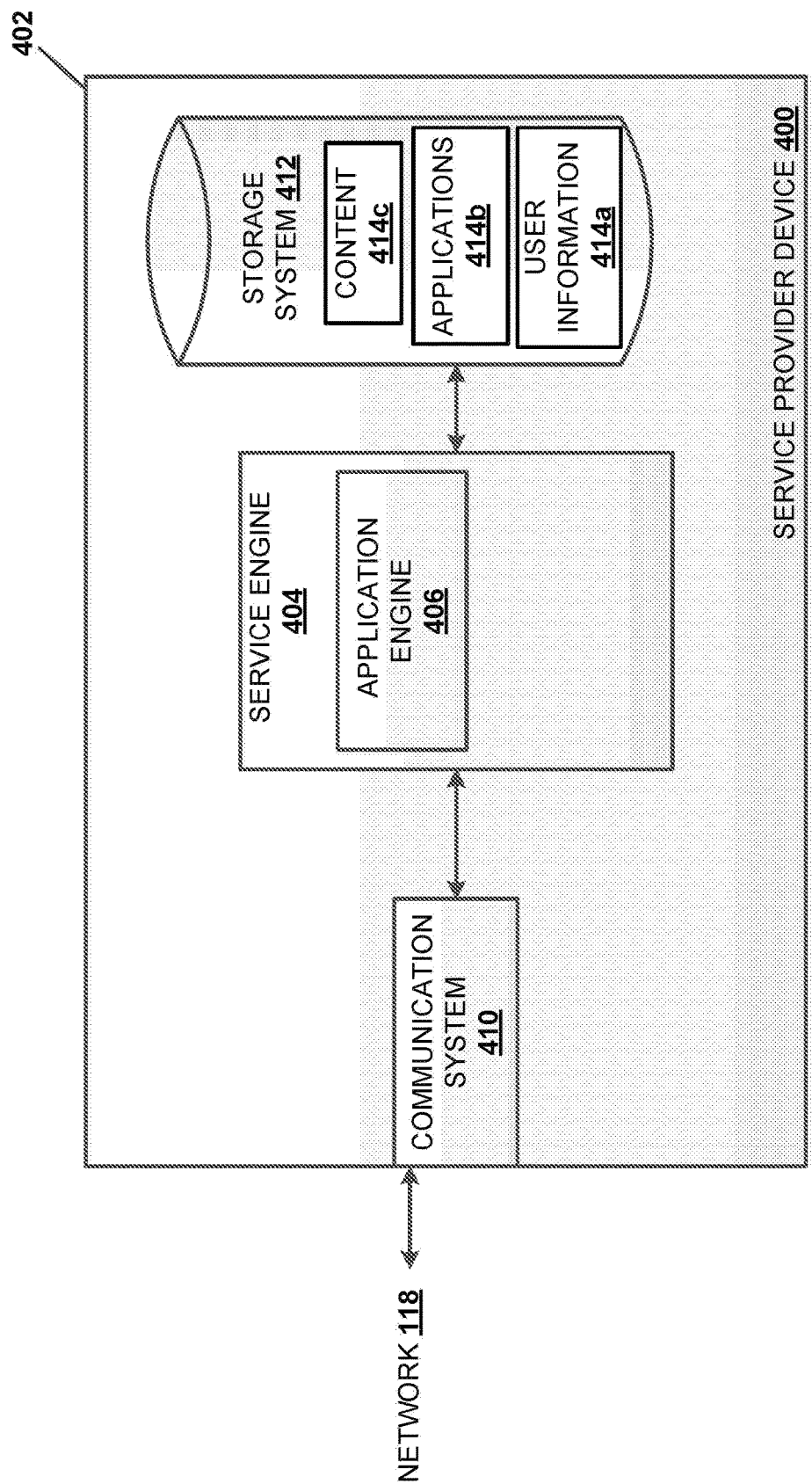
FIG. 4 is a schematic view illustrating an embodiment of a service provider device of the communication channel merging system of FIG. 1.

Referring now to FIG. 4, an embodiment of a service provider device 400 is illustrated that, in some embodiments, may be the service provider device 106 discussed above. As such, in some examples the service provider device 400 may be provided by one or more server devices. However, one of skill in the art in possession of the present disclosure will recognize that the service provider device 400 may be provided by any of a variety of computing devices such as desktop computing systems, laptop/notebook computing systems, tablet computing systems, mobile phones, Application Specific Integrated Circuit (ASIC) computing systems, and/or other computing device known in the art, while remaining within the scope of the present disclosure.

In the illustrated embodiment, the service provider device 400 includes a chassis 402 that houses the components of the service provider device 400, only some of which are illustrated in FIG. 4. For example, the chassis 402 may house a processing system (not illustrated) and a non-transitory memory system (not illustrated) that includes instructions that, when executed by the processing system, cause the processing system to provide a service engine 404 that is configured to perform the functions of the service engines and service provider devices discussed below. For example, the service engine 404 may include an application engine 406 that is configured to provide applications, webpages, and other service applications to a user computing device, as well as provide any of the other functions of the application engines discussed below.

The chassis 402 may further house a communication system 410 that is coupled to the service engine 404 (e.g., via a coupling between the communication system 410 and the processing system) and configured to provide for communication through the network 118 as detailed below. The communication system 410 may be provided by a network Interface Controller (NIC), a wireless communication subsystem (e.g., a WiFi communication subsystem, a BLUETOOTH communication subsystem, a Near Field communication (NFC) subsystem, and/or other wireless communication subsystems known in the art), and/or any other communication components that would be apparent to one of skill in the art in possession of the present disclosure. In the illustrated embodiment, the service provider device 400 also includes a storage system 412 with a database that stores user information 414a, application(s) 414b, content 414c, as well as any of the other information utilized to provide the functionality discussed in further detail below. While the service provider device 400 is illustrated as including a chassis 402 that houses the storage system 412, one of skill in the art in possession of the present disclosure will recognize that the storage system 412 may be provided in a different device/chassis than the service provider device 400 (e.g., a network attached storage device and/or any other device or storage system known in the art) while remaining within the scope of the present disclosure. In some embodiments, the storage system 412 may be provided by the strategic servicing database 116 of FIG. 1. While a specific service provider device 400 has been illustrated and described, one of skill in the art in possession of the present disclosure will recognize that service provider devices may include other components and/or component configurations for performing conventional functionality, as well as the functionality discussed below, while remaining within the scope of the present disclosure.

Figure 5:
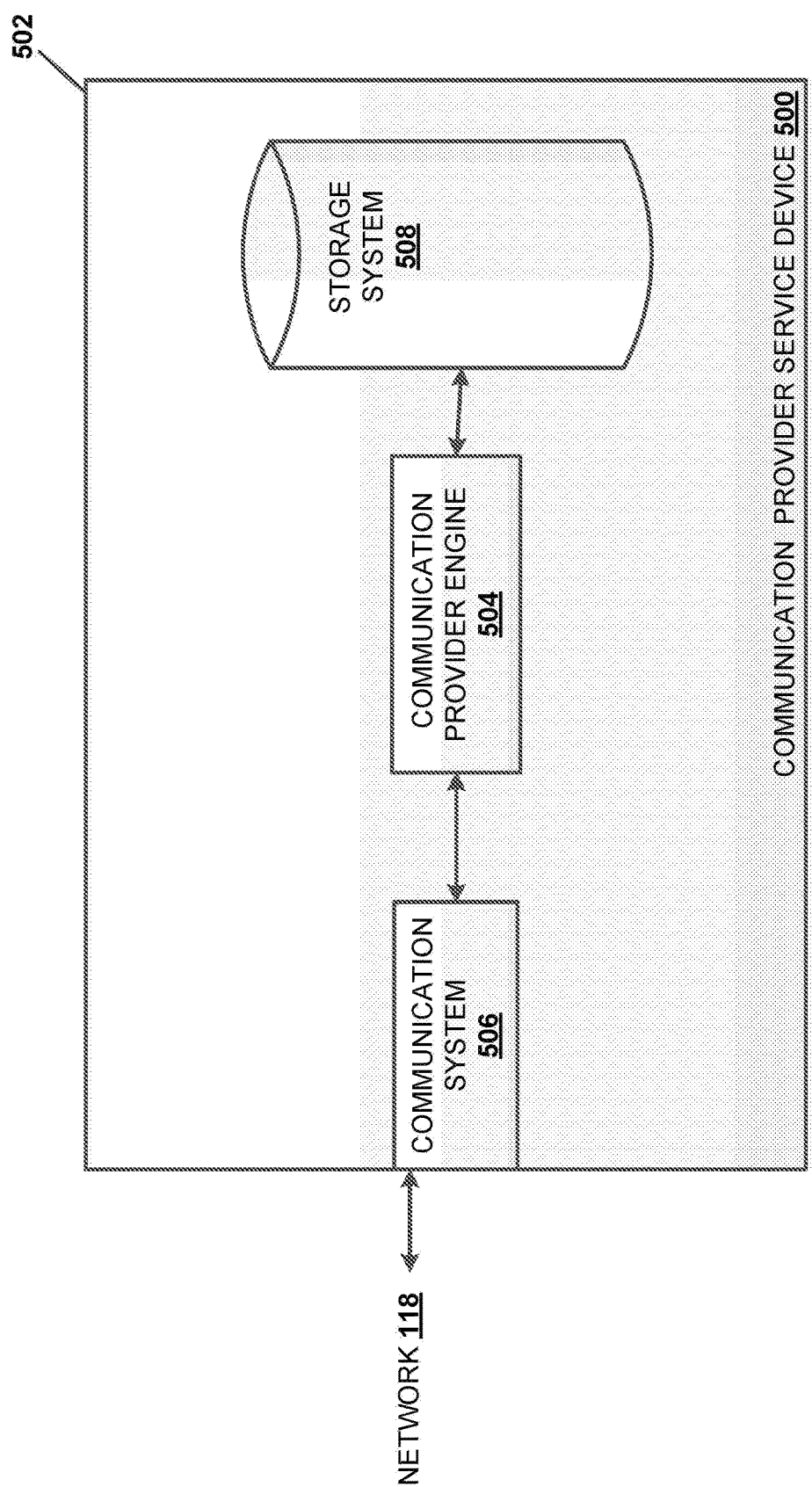
FIG. 5 is a schematic view illustrating an embodiment of a communication provider service device of the communication channel merging system of FIG. 1.

Referring now to FIG. 5, an embodiment of a communication provider service device 500 is illustrated that, in some embodiments, may be the communication provider service device(s) 108 or 110 discussed above. As such, in some examples the communication provider service device 500 may be provided by one or more server devices. However, one of skill in the art in possession of the present disclosure will recognize that the communication provider service device 500 may be provided by any of a variety of computing devices such as desktop computing systems, laptop/notebook computing systems, tablet computing systems, mobile phones, Application Specific Integrated Circuit (ASIC) computing systems, and/or other computing device known in the art, while remaining within the scope of the present disclosure.

In the illustrated embodiment, the communication provider service device 500 includes a chassis 502 that houses the components of the communication provider service device 500, only some of which are illustrated in FIG. 5. For example, the chassis 502 may house a processing system (not illustrated) and a non-transitory memory system (not illustrated) that includes instructions that, when executed by the processing system, cause the processing system to provide a communication provider engine 504 that is configured to perform the functions of the message provider engines and the communication provider service devices discussed below. For example, the communication provider engine 504 may provide a live chat platform, a bot platform, an asynchronous messaging platform, an e-mail platform, an audiovisual platform, an IVR platform, and/or any other communication platforms voice, video, and/or text that would be apparent to one of skill in the art in possession of the present disclosure, as well as provide any of the other functions of the communication provider engines discussed below.

The chassis 502 may further house a communication system 506 that is coupled to the communication provider engine 504 (e.g., via a coupling between the communication system 506 and the processing system) and configured to provide for communication through the network 118 as detailed below. The communication system 506 may be provided by a network Interface Controller (NIC), a wireless communication subsystem (e.g., a WiFi communication subsystem, a BLUETOOTH communication subsystem, a Near Field communication (NFC) subsystem, and/or other wireless communication subsystems known in the art), and/or any other communication components that would be apparent to one of skill in the art in possession of the present disclosure. The chassis 502 may also house a storage system 508 that is coupled to the application engine through the processing system. The storage system 508 may store rules, settings, and/or other data utilized by the communication provider engine 504 to provide the functionality discussed below. While the storage system 508 has been illustrated as housed in the chassis 502 of the communication provider service device 500, one of skill in the art will recognize that it may be connected to communication provider engine 504 through the network 118 without departing from the scope of the present disclosure. While a specific communication provider service device 500 has been illustrated and described, one of skill in the art in possession of the present disclosure will recognize that message provider service devices may include other components and/or component configurations for performing conventional functionality, as well as the functionality discussed below, while remaining within the scope of the present disclosure.

Figure 6:
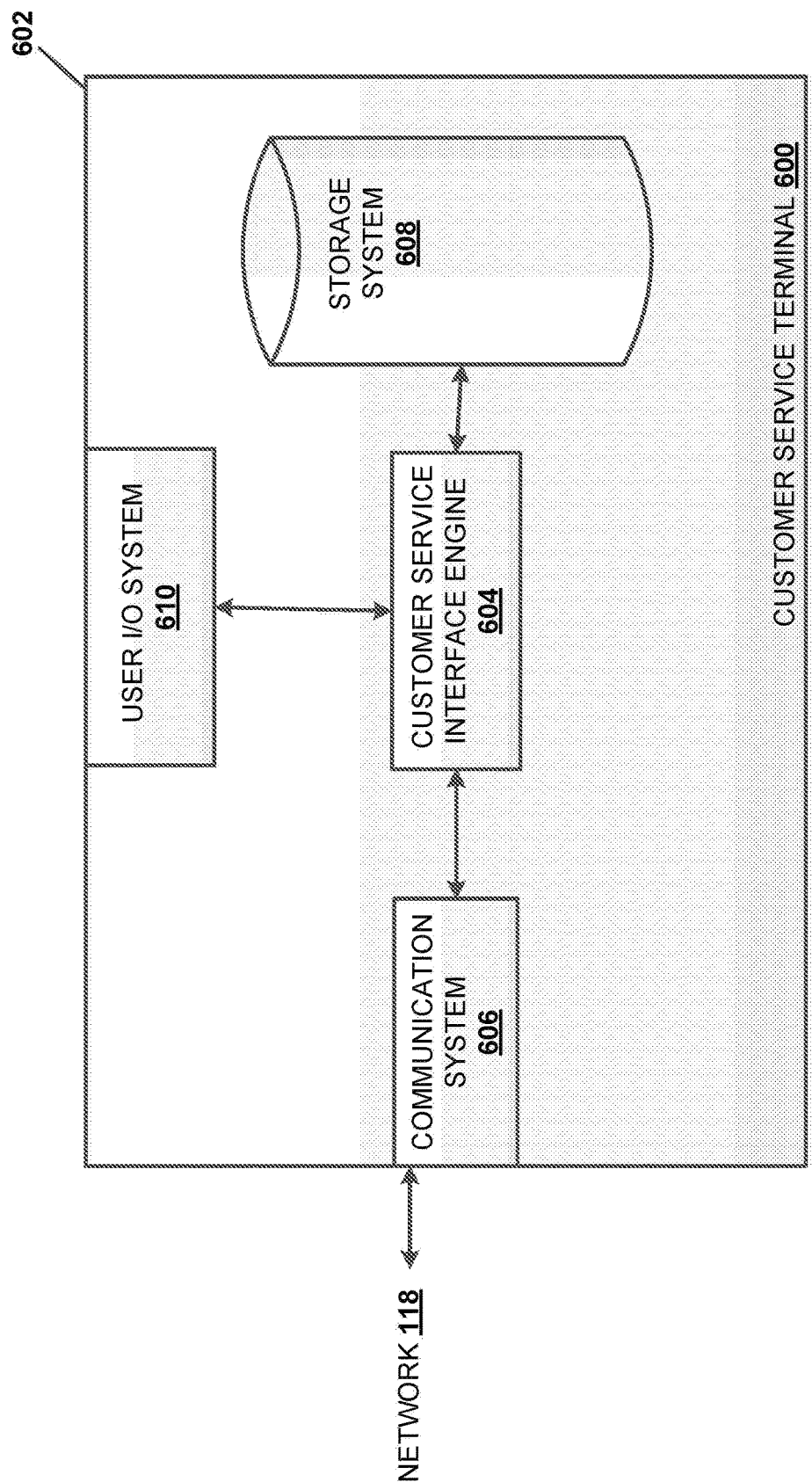
FIG. 6 is a schematic view illustrating an embodiment of a customer service terminal of the communication channel merging system of FIG. 1.

Referring now to FIG. 6, an embodiment of a customer service terminal 600 is illustrated that, in some embodiments, may be the customer service terminal 112 discussed above with reference to FIG. 1. As such, in some examples the customer service terminal 600 may be provided by one or more user computing devices such as desktop computing systems, laptop/notebook computing systems, tablet computing systems, mobile phones, Application Specific Integrated Circuit (ASIC) computing systems, and/or other computing device known in the art, while remaining within the scope of the present disclosure.

In the illustrated embodiment, the customer service terminal 600 includes a chassis 602 that houses the components of the customer service terminal 600, only some of which are illustrated in FIG. 6. For example, the chassis 602 may house a processing system (not illustrated) and a non-transitory memory system (not illustrated) that includes instructions that, when executed by the processing system, cause the processing system to provide a customer service interface engine 604 that is configured to perform the functions of the application engines and user computing devices discussed below. For example, the customer service interface engine 604 may provide a communication interface to the customer service terminal 600 that allows a representative to communicate with a user, as well as perform any of the other functions of the customer service interface engine discussed below.

The chassis 602 may further house a communication system 606 that is coupled to the customer service interface engine 604 (e.g., via a coupling between the communication system 606 and the processing system) and configured to provide for communication through the network 122 as detailed below. The communication system 606 may be provided by a network Interface Controller (NIC), a wireless communication subsystem (e.g., a WiFi communication subsystem, a BLUETOOTH communication subsystem, a Near Field communication (NFC) subsystem, and/or other wireless communication subsystems known in the art), and/or any other communication components that would be apparent to one of skill in the art in possession of the present disclosure. The chassis 602 may also house a storage system 608 that is coupled to the customer service interface engine 604 through the processing system. The storage system 608 may store rules, settings, and/or other data utilized by the customer service interface engine 604 to provide the functionality discussed below. While the storage system 608 has been illustrated as housed in the chassis 602 of the customer service terminal 600, one of skill in the art will recognize that it may be connected to the customer service interface engine 604 through the network 118 without departing from the scope of the present disclosure.

In various embodiments, the chassis 602 also houses a user input/output (I/O) system 610 that is coupled to the customer service interface engine 604 (e.g., via a coupling between the processing system and the user I/O system 610). In an embodiment, the user I/O system 610 include one or more input devices that may be provided by a keyboard input subsystem, a mouse input subsystem, a track pad input subsystem, a touch input display subsystem, an imaging system (e.g., a camera), a microphone, and/or any other input subsystem. The user I/O system 610 include one or more output devices that may be provided by a display subsystem, a haptic feedback subsystem, a speaker subsystem, and/or other output subsystem. In various embodiments, input devices and/or the output devices may be provided by subsystems that are integrated into the customer service terminal 600 or by subsystems that is coupled directly to the customer service terminal 600 (e.g., a display device coupled to a desktop computing device by a cabled or wireless connection). While a specific customer service terminal 600 has been illustrated and described, one of skill in the art in possession of the present disclosure will recognize that customer service terminals may include other components and/or component configurations for performing conventional functionality, as well as the functionality discussed below, while remaining within the scope of the present disclosure.

Figure 7:
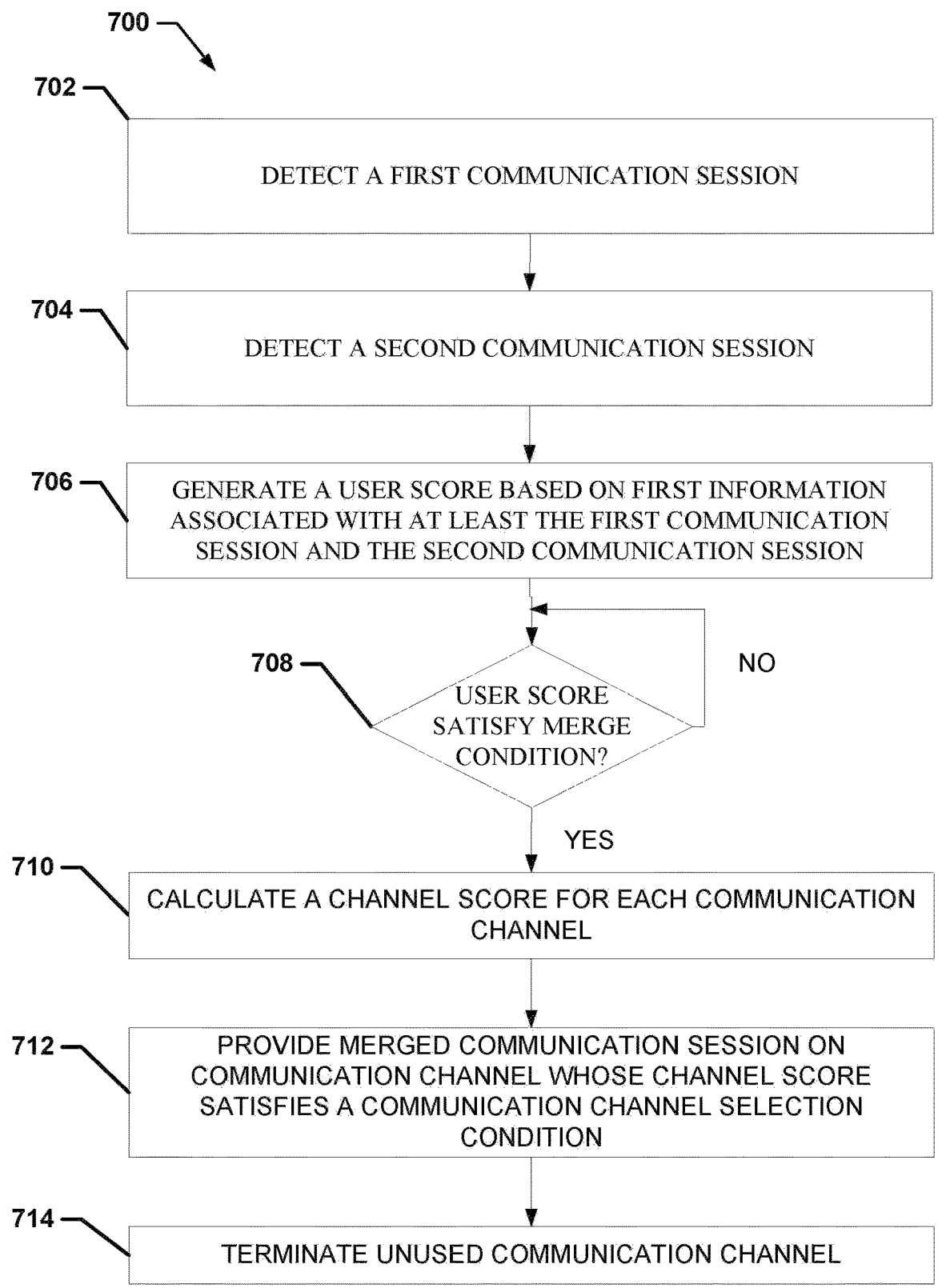
FIG. 7 is a flow chart illustrating an embodiment of a method of merging communication channels using the communication channel merging system of FIG. 1.

Referring now to FIG. 7 and with reference to FIGS. 1-6 and 8-11, a method 700 for merging communication channels is illustrated. In some embodiments of the method 700 described below, the strategic servicing device 114 in the communication channel merging system 100 of FIG. 1 may perform the method 700. For example, the strategic servicing device 114 may merge communications sessions that are on concurrently active channels such as between a user and one or more communication provider services for customer support. The strategic servicing device may cause the merge when a user score satisfies a merge condition and select which of the active channels to host a merged communication session based on one or more channel scores calculated for the active channels. As such, system resources may be conserved, providing a more efficient customer service system and experience for the user. For example, a payment service provider such as, for example, PayPal, Inc. of San Jose, Calif., may utilize an strategic servicing device 114 to perform the method 700 discussed below, and in some embodiments may operate in cooperation with one or more other service providers (via their service provider devices), communication provider service devices, and/or users (via their user computing devices) to perform the method 700 discussed below. However, these embodiments are meant to be merely examples, and one of skill in the art in possession of the present disclosure will recognize that a wide variety of service providers and users may operate, alone or together, to provide the systems and methods discussed herein without departing from the scope of the present disclosure.

The method 700 begins at block 702 where a first communication session is detected via a first communication channel between a first user communication interface associated with a first user computing device associated with a first user, and a first communication provider service device associated with a first communication provider of a plurality of communication providers that are associated with a first entity. In an embodiment, at block 702, the strategic servicing engine 204 provided by the strategic servicing device 114/200 may detect a first communication session between the user computing device 102 and the communication provider service device 108. For example, the communication provider engine 504 of the communication provider service device 108/500 may provide a communication session notification to the strategic servicing device 114/200. The communication session notification may include communication session information about the communication session and the communication channel it is provided on. For example, the communication session information may include user information about the user in the communication session, (e.g., user authentication information, user intent, user account information associated with the service provider device 106, user identifiers, and/or any other information associated with the user), user computing device information (e.g., information about the capabilities, type, configuration, etc. of the user computing device 102), communication channel information (e.g., information about the type of communication channel (e.g., asynchronous chat), network functionality, and other communication channel information), communication provider service device information (e.g., information about the capabilities, status, capacity, wait times, and other information associated with the communication provider service device 108), customer service terminal information (e.g., information about any customer service terminals 112 that are used in connection with the communication provider service device), and/or any other information that would be apparent to one of skill in the art in possession of the present disclosure.

As used herein, a communication channel may refer to as the physical pathway on which a communication session between a user and a customer service representative may occur or that is about to occur. For example, a communication channel may be established once a user computing device 102/104 establishes a connection with one the communication provider service device 108-110. However, the communication channel may later be expanded to include the pathway to the customer service terminal 112 via one the communication provider service devices. For example, a communication channel may be created when a user establishes a connection with an IVR, which may queue the user for a customer service representative at the customer service terminal 112. Once the representative becomes available, the communication channel may expand to include the customer service terminal 112. The communication session may be provided on each a communication channel and associated with a communication session identifier. The communication session may refer to any of the communications that are provided across the communication channel.

Figure 8:
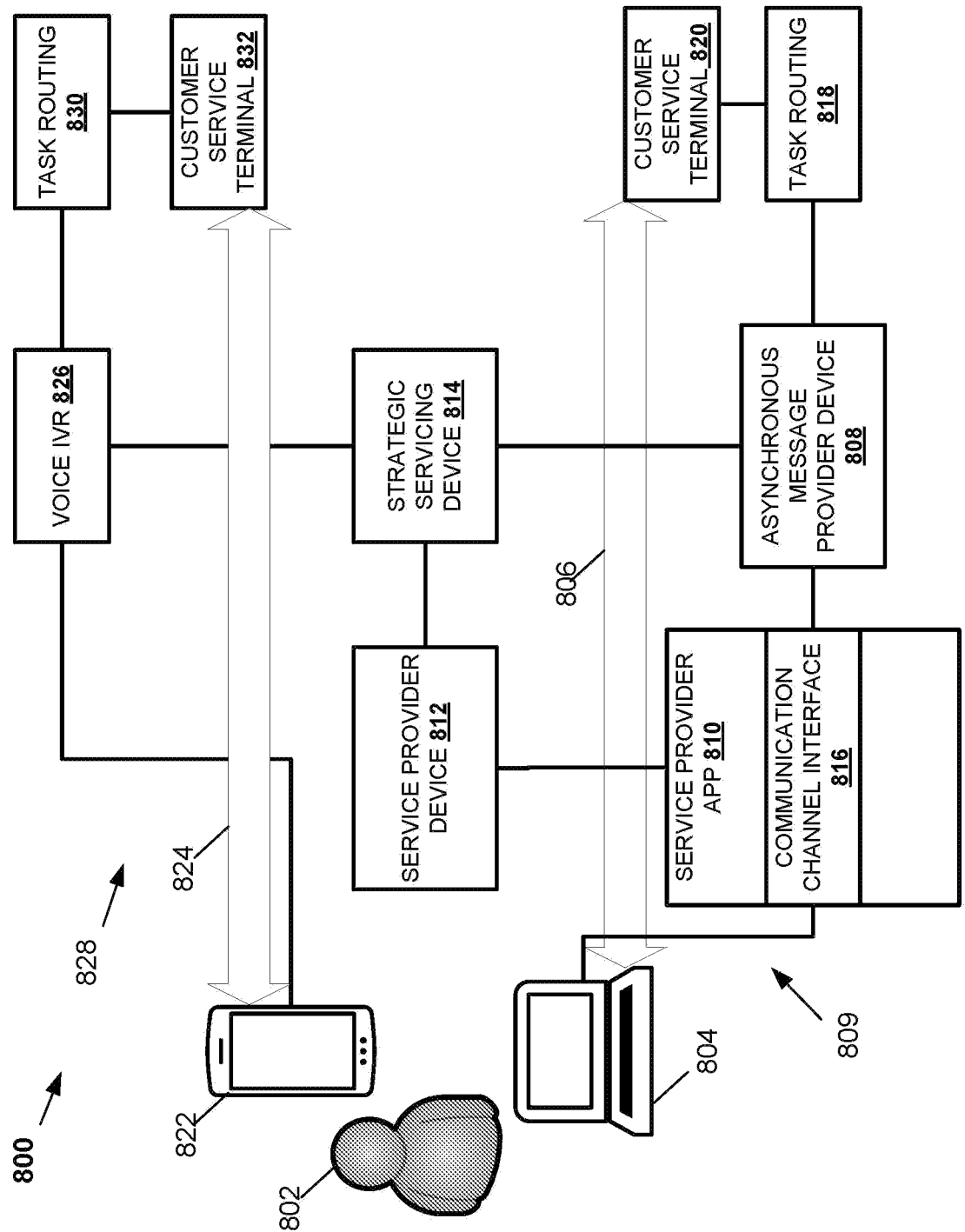
FIG. 8 is a block diagram illustrating an embodiment of the communication channel merging system of FIG. 1 during the method of FIG. 7.

In a specific example and referring to a communication session merging system block diagram 800 of FIG. 8, a user 802, at a first time via a user computing device 102/804, may initiate a communication session 806 with one of the communication provider service devices 108-110. For example, the communication provider service device 108 may be an asynchronous message provider device 808 and the communication session 806 may be provided on the communication channel 809 that includes the asynchronous message provider device 808. In one scenario where the user 802 may establish the communication session 806, the user 802 may open a service provider application 810 (e.g., a web application via a web browser, or a native application) associated with the entity/service provider (e.g., PayPal) associated with the service (e.g., a payment service) provided by a service provider device 812, which may be the service provider device 106 of FIG. 1 and the service provider device 400 of FIG. 4. However, in other embodiments, a third-party application may be able to access the entity's communication channel merging system 100 and communicate with one or more of the communication provider service devices 108-110. In some embodiments, the user 802 may be required to perform user authorization such as providing credentials before given access to the service provider application 810 and access to interact with one or more services provided by the service provider device 812.

The user 802 may perform actions such as interacting with various services, icons, links, applications, workflows (e.g., complete a payment, purchase of an item, etc.) and/or any other interaction that may be performed with the service provider device 812 (e.g., the application engine 406 that provides content 414c and/or applications 414b) via the service provider application 810. User information 414a may be gathered and stored by the service engine 404 of the service provider device 400/812 during the user's 802 interactions with the service provider application 810 and the service provider device 812. The user information 414a may include tracking of the user's 802 interactions with the service provider application 810 and/or the service provider device 812, authentication information, user demographic information, user location information, device information associated with the user computing device 804, user preferences, and/or any other user information associated with the user 802 and/or the user computing device 804 that would be apparent to one of skill in the art in possession of the present disclosure. The service provider device 812 may provide the user information 414a, via the network 118, to a strategic servicing device 814 that may be the strategic servicing device 114/200 of FIGS. 1 and 2.

While interacting with the service provider application 810, the user may access a communication channel interface 816 of one or more communication channel interfaces provided by the channel interface engine 306 of the user computing device 102/300/804 to initiate a customer service experience via a communication session. For example, the user 802 may seek help resolving why a payment was declined, an address change, forgotten credentials, and/or for any other reason that a customer may contact a customer support for the service provider associated with the service provider device 812 that would be apparent to one of skill in the art in possession of the present disclosure. The communication channel interface 816 may include an asynchronous chat communication interface for the asynchronous chat communication channel 809 that provides the asynchronous chat communication session 806 between the user computing device 804 and the asynchronous message provider device 808. However, the communication session 806 may be between the communication channel interface 816 and another message provider service such as a bot platform, a live-chat platform, an email platform, and/or any other communication platform that may be apparent to one of skill in the art in possession of the present disclosure.

The user 802, via the communication channel interface 816, may request the communication session 806 when the user 802 enters a command, inquiry, or other communication session initiation action that would be apparent to one of skill in the art in possession of the present disclosure. In response to the communication initiation action, the asynchronous message provider device 808 may open the communication session 806 and generate a communication session identifier associated with the communication session 806 and associated with a user identifier (e.g., a device identifier for the user computing device 102/804, an email address associated with the user 802, an account number for the service provider that is associated with the user 802, a service provider username associated with the user 802, a name of the user 802, a phone number associated with the user 802, the personal identification number for the user 802, and/or any other user identifier that would be apparent to one of skill in the art in possession of the present disclosure). The asynchronous message provider device 808 may provide the communication session identifier to the strategic servicing device 814. As such, the strategic servicing device 814 may detect the communication session between the user computing device 804 associated with the user 802 and a communication provider service device (e.g., the asynchronous message provider device 808) associated with a first communication provider of a plurality of communication providers that are associated with the entity, according to block 702, when the strategic servicing device 814 receives the communication session identifier. However, it is contemplated that the strategic servicing device 814 may detect the communication session 806 when the user 802 requests the communication session 806, may monitor the asynchronous message provider device 808 for active communication sessions, and/or via any other notification mechanism that would be apparent to one of skill in the art in possession of the present disclosure.

In various embodiments, when the communication session 806 is established, the asynchronous message provider device 808 may perform task routing 818 via communication provider engine 504 such that the communication session 806 may be conducted by an appropriate customer service representative at the customer service terminal 820, which may be the customer service terminal 112/600 of FIGS. 1 and 6. For example, the asynchronous message provider device 808 via the task routing may route the communication session 806 to a customer service terminal 820 that is associated with a customer service representative that handles a particular intent, that has a short wait time, and/or other task routing conditions that may be apparent to one of skill in the art in possession of the present disclosure. In some examples, a communication sent by the user 802 via the communication session 806 may be queued until a customer service representative is available at the customer service terminal 820.

The communication session 806 may be associated with an intent that is received by or detected based on a user interaction with the service engine 404 of the service provider device 106/400/812 such as, for example, a user interaction with a help webpage of a website provided by the service engine 404 that the user 802 of the user computing device 804 requests customer service help. The service engine 404 may provide to a strategic service device 114/814 the user interaction which may include any of the interaction information that is available (e.g., messages sent that may be processed by the NLP engine 210). The asynchronous message provider device 808 may provide any interaction information from which user intent may be determined. Based on the interaction information, the intent/BNA engine 208 of the strategic service device 814 may determine an intent of the user that is interacting with the asynchronous message provider device 808 based on the interaction information. The intent/BNA engine 208 may determine that the intent of the user 802 of the user computing device 804 is to connect with a customer help service to obtain help on a specific topic (e.g., a declined payment).

In various embodiments, the communication session 806 may be established and associated with the intent. The communication session 806 may remain open until the intent is resolved. Thus, the communication session 806 may remain open while it is stored in a queue until a customer service representative and/or application resources (e.g., chat bots) become available to service the communication session 806. In some embodiments, the communication session 806 may be open when the user computing device 804 disconnects from the communication channel 809 because the intent is being resolved. In other examples, the communication session may remain open during active communications between the user 802 and the customer service terminal 820. The communication session 806 may only close or be deactivated when the user 802, a customer support representative of the customer service terminal 820, and/or a chat bot determines that the intent has been resolved, a timeout period has lapsed, and/or any other communication session closing condition that would be apparent to one of skill in the art in possession of the present disclosure. As such, a communication session that is associated with a user and provided on a communication channel may remain active indefinitely.

Referring back to FIG. 7, the method 700 may then proceed to block 704, where a second communication session is detected via a second communication channel between a second user communication interface associated with the first user, and a second communication provider service device associated with a second communication provider of the plurality of communication providers that are associated with the first service provide/entity. The second communication session may be active while the first communication session is active such that the first communication session and the second communication session are active concurrently for at least a portion of the time they are active. In an embodiment, at block 704, the strategic servicing engine 204 of the strategic servicing device 114/200 may detect a second communication session between the user computing device 104 and the communication provider service device 110 or the strategic servicing engine 204 may detect a second communication session on the user computing device 102 (via a different communication channel interface used for the first communication session) and the communication provider service device 110. For example, the communication provider engine 504 of the communication provider service device 110/500 may provide a communication session notification to the strategic servicing device 114/200. The communication session notification may include communication session information about the communication session and the communication channel it is provided on. For example, the communication session information may include user information about the user in the communication session, user computing device information, communication channel information, communication provider service device information, customer service terminal information, and/or any other information that would be apparent to one of skill in the art in possession of the present disclosure.

In a specific example and referring to a communication session merging system block diagram 800 of FIG. 8, the user 802, at a second time that is subsequent to the first time but prior to a third time when the first communication session ends, may initiate, via a user computing device 104/822 a communication session 824 with one of the communication provider service devices 108-110. In the illustrated example, the user computing device 104/822 is a smart phone device instead of a laptop computing device that provides the user computing device 102/804. As such, the communication provider service device 110 may be a voice IVR device 826 that provides the communication channel 828. In a specific scenario, the user 802 may call a customer service center via the user computing device 804 that is associated with the user 802. The user 802 may have been frustrated with the asynchronous message provider device 808 due to the asynchronous message provider device 808 not resolving an issue associated with that user's intent, due to the asynchronous messaging device 808 having a long wait times in the queue, due to the user 802 forgetting about the communication session 806, due to the user 802 wanting to service another inquiry or intent, and/or for any other reason that the user 802 would initiate another communication session 824 while the communication session 806 on the communication channel 809 is still active. In the illustrated example, the user 802 may initiate an address change to the user's account information via the communication session 824 and the communication channel 828. However, in other embodiments, the user 802 may initiate the communication session 824 for the same reason that the user 802 initiated the communication session 806.

The user 802, via the user computing device 822, may request the communication session 824 when the user 802 performs a command, an inquiry, or other communication session initiation action that would be apparent to one of skill in the art in possession of the present disclosure. For example, the voice IVR device 826 may generate a communication session identifier associated with the communication session 824 and associated with a user identifier for the user 802 (e.g., a device identifier for the user computing device 102/804, an email address associated with the user 802, an account number for the service provider that is associated with the user 802, a service provider username associated with the user 802, a name of the user 802, a phone number associated with the user 802, the personal identification number for the user 802, and/or any other user identifier that would be apparent to one of skill in the art in possession of the present disclosure). The communication session 824 may be generated when the voice IVR device 826 answers the call from the user computing device 822. The voice IVR device 826 may provide the communication session identifier to the strategic servicing device 814. As such, the strategic servicing device 814 may detect the communication session between the user computing device 822 associated with the user 802 and a communication provider service device (e.g., the voice IVR device 826) associated with a second communication provider of the plurality of communication providers that are associated with the entity/service provider of the service provider device 812, according to block 704, when the strategic servicing device 814 receives the communication session identifier. However, it is contemplated that the strategic servicing device 814 may detect the communication session 824 when the user 802 requests the communication session 824, may monitor the voice IVR device 826 for active communication sessions, and/or any other notification mechanism that would be apparent to one of skill in the art in possession of the present disclosure.

In various embodiments, when the communication session 824 is established, the voice IVR device 826 may perform task routing 830 such that the communication session 826 may be conducted by an appropriate customer service representative at the customer service terminal 832, which may be the customer service terminal 112/600 of FIGS. 1 and 6. A communication sent by the user 802 and/or the communication session 824 may be queued until a customer service representative is available at the customer service terminal 832. The communication session 824 may be associated with an intent that is received by or detected based on a user interaction with the service engine 404 of the service provider device 106/400/812. In other examples, the intent of the user for contacting the voice IVR device 826 may be based on any information that is received or detected by a user interaction with the voice IVR device 826. The user interaction may include any of the interaction information that is available. The voice IVR device 826 may provide any interaction information (e.g., voice transcripts and/or audio data) from which user intent may be determined to the strategic service device 814. Based on the interaction information, the intent/BNA engine 208 of the strategic service device 814 may determine an intent of the user that is interacting with the voice IVR device 826 based on the interaction information. The intent/BNA engine 208 may determine that the intent of the user 802 of the user computing device 822 is to connect with a customer help service to obtain help on a specific topic (e.g., an address change).

In various embodiments, the communication session 824 may be established and associated with the intent. The communication session 824 may remain open until the intent is resolved. Thus, the communication session 826 may remain open while it is stored in a queue waiting for a customer service representative to become available at the customer service terminal to service the communication session 824. In some embodiments, the communication session 824 may still be open when the user computing device 822 disconnects from the communication channel 828 without the intent being resolved. In other examples, the communication session 824 may remain open during active communications between the user 802 and the customer service terminal 832. The communication session 806 may only close or be deactivated when the user 802, a customer support representative of the customer service terminal 832 and/or an artificial intelligence module determines that the intent has been resolved, a timeout period has lapsed, and/or any other communication session closing condition that would be apparent to one of skill in the art in possession of the present disclosure.

At the strategic servicing device 814, the communication session management engine 206 may determine that the communication session 806 on the communication channel 809 and the communication session 824 on the communication channel 828 are associated with the same user based on user identifiers associated with the communication session identifier for the communication session 806 and 824. For example, the channel interaction logs 236 included in the storage system 228, which may be provided by the strategic servicing database 116, may include logs of inactive and active communication sessions on the various communication channels provided by the communication channel merging system 100. In other examples, the channel interaction logs 236 may include communication session identifiers for the communication session 806 and the communication session 824. Those communication session identifiers may be mapped to user identifiers identifying the user 802 of the communication sessions 806 on the communication channel 809 and the communication session 824 on the communication channel 828. The strategic servicing engine 204 via the communication session management engine 206 and/or the channel merging engine 216 may determine based on the communication session identifiers and mapped user identifiers that there are at least two concurrent active communication sessions between the user 802 and the communication service providers.

Referring back to FIG. 7, the method 700 then proceeds to block 706 where a user score is generated based on first information associated with at least the first communication session and the second communication session. In an embodiment, at block 706, the channel merging engine 216 provided by the strategic servicing engine 204 provided by the strategic servicing device 114/200 may determine a user score that is generated based on information associated with the communication sessions that are concurrently active. The user score may be a value (e.g., 1-100 or some other numerical scale). The information associated with the communication session may include any of the user information 414a, the system logs 230, the configurations 232, communication history 234 that includes the communications between the user associated with the user computing devices 102 and/or 104, channel interaction logs 236, and/or any other information that would be apparent to one of skill in the art in possession of the present disclosure (e.g., user information, user computing device information, service provider device information, communication provider service device information, customer service terminal information, etc.).

For example, the user score may be based on the intents of each of the first communication session and the second communication session. Where the intents of the first communication session and the second communication session are the same, a user score for such a situation may be different than a user score for a situation where the first communication session and the second communication session have different intents. Specifically, if the intent of the first communication session is more pertinent than the intent of the second communication session, then the user score for the first communication session may be greater than the user score for the second communication session. In various examples, the intent of each communication session may be provided in the communication history 234 and/or the channel interaction logs 236.

In another example, the user score may be based on user information 414a associated with the user such as user demographics, history of previous merges, authentication information, user demographic information, user location information, device information associated with the user computing device(s), user preferences, user transaction history, length of time that the user has been a customer, a customer status of the user with the service provider (e.g., a standard or preferred customer), other metrics that show how valuable the user is to the service provider, and/or any other user information associated with the user and/or the user computing device that would be apparent to one of skill in the art in possession of the present disclosure. In other examples, the user score may be based on where in the process each communication session is at. For example, when one communication session has a customer service representative interacting with the user while the other communication session is still in a queue, the user score may be different than if both of the communication sessions are in a queue or if both communication sessions are being handled by a customer service representative.

In other examples, the user score may be based on whether a communication channel can handle the intent of the other communication channel or based on the success rate of processing intents on either of the communication channels. For example, if the asynchronous chat provided by the communication channel 809 can handle the payment decline intent of the communication session 806 better than the voice IVR device 826 and the voice IVR device 826 is better at handling address change that is the intent of the communication session 824, then the user score may be lower than if the voice IVR device 826 more successfully processes payment declined intents and/or the asynchronous message provider device 808 more successfully processes address change intents. In other examples, cost of merging communication channels versus the cost of not merging communication channels may influence the user score. While specific examples of information that may influence the user score at block 706 are described, one of skill in the art in possession of the present disclosure will recognize that other information based on the user, the user computing device, the communication channels, the communication sessions, and/or the conditions of the communication channel merging system 100, the service provider device 106, the communication provider service devices 108-110, and/or the strategic servicing device 114 may be used to generate user score.

The method 700 then proceeds to decision block 708 where it is determined whether the first user score satisfies a merge condition. In an embodiment, at decision block 708, the channel merging engine 216 may determine whether the user score satisfies a merge condition. For example, the channel merging engine 216 may compare the user score determined at block 706 to a user score threshold (e.g., a predetermined value of 1-100) such that if the user score is at or above the user score threshold, then the user score satisfies the merge condition. If the user score is below the user score threshold, then the user score does not satisfy the merge condition. While a specific merge condition is described, one of skill in the art in possession of the present disclosure will recognize that the user score may satisfy other merge conditions and still fall under the scope of the present disclosure.

If at decision block 708 the first user score does not satisfy the merge condition, the method 700 may proceed back to block 706 where the user score may be regenerated based on changing conditions and/or information that is generated based on second information associated with at least the first communication session and the second communication session. For example, the channel merging engine 216 may recalculate the user score at a subsequent time or in response to detecting a change in information associated with the first communication session and/or the second communication session.

If at decision block 708 the first user score satisfies the merge condition, the method 700 proceeds to block 710 where a channel score is generated for each active communication channel associated with the user. For example, a first channel score is generated for the first communication channel and a second channel score is generated for the second communication channel. In an embodiment at block 712, the channel merging engine 216, in addition to determining whether to merge the communication sessions, may determine which of the communication channels to provide a merged communication session. To determine which of the communication channels to provide the merged communication session, the channel merging engine 216 may determine a channel score for each of the active communication sessions associated with the user. The channel scores may be based on at least communication channel information associated with the communication channels such as, for example, an estimated wait time, hours of operation for the communication channel, cost of the communication channel, ability to service the intents associated with the communication sessions on the various communication channels, and/or any other user information (e.g., any user information that is used to calculate the user score: user demographics, history of previous merges, authentication information, user demographic information, user location information, device information associated with the user computing device(s), user preferences, user transaction history, length of time that the user has been a customer, a customer status of the user with the service provider (e.g., a standard or preferred customer), other metrics that show how and/or any other user information associated with the user and/or the user computing device or information used to calculate the user score that would be apparent to one of skill in the art in possession of the present disclosure). Other information for calculating a channel score may include strategic servicing device information, user computing device information, customer service provider device information, service device information, and/or other relevant information for selecting the most appropriate communication channel for a merged communication session that would be apparent to one of skill in the art in possession of the present disclosure.

Based on the available information and one or more channel score conditions that are being monitored by the, the scores from one or more channel score conditions may be combined when calculating the channel score for each communication channel. For example, the strategic servicing device 814 may provide a score for a proximity condition such that if the strategic servicing device 814 determines that the user 802 is in close proximity to the user computing device 822 over the user computing device 804 based on available information, then the strategic servicing device 814 may increase the channel score for the communication channel 828 to a higher degree than the channel score given to the communication channel 809 for the proximity condition In another example, the strategic servicing device 814 may provide a score for a customer status condition such that if the user 802 is a preferred customer, then the strategic servicing device 814 may increase the channel score for the communication channel 828 to a higher degree than the channel score given to the communication channel 809 for the customer status condition because the Voice IVR 826 may have a better customer satisfaction rating. In yet another example, the strategic servicing device 814 may provide a score for a wait time condition, such that if the wait time for the communication channel 828 to connect with a service representative via the customer service terminal 832 is longer than the communication channel 809, then the strategic servicing device 814 may increase the channel score for the communication channel 809 to a higher degree than the channel score given to than the communication channel 828 for the wait time condition. As such, all of these scores calculated for each condition may be combined when calculating the channel scores for the communication channels 809 and 828.

If the channel score of one of the communication channels satisfies a communication channel selection condition, then that communication channel may be selected to host the merged communication session. For example, the communication channel selection condition may include a condition that the greatest channel score will be selected to host the merged communication session. As such, if the first channel score for the first communication channel is greater than the second channel score for the second communication channel, the first communication channel will be selected to host the merged communication session. In the illustrated example in FIG. 8, the strategic servicing device 814 may calculate a channel score for both the communication channel 809 and the communication channel 828. The strategic servicing device 814 may calculate a channel score for the communication channel 828 that is greater than a channel score for the communication channel 809. As such, the channel score of the communication channel 828 may satisfy the communication channel selection condition such that the communication channel 828 is the preferred communication channel on which to host the merged communication session, and the method 700 may proceed to block 712.

However, in other examples and in response to determining a communication channel on which to provide the merged communication session, the strategic servicing device 114/200 may provide a merge communication session prompt to the user that indicates the communication channel on which to provide the merged communication session. For example, the strategic servicing device 814 of FIG. 8 may provide a merge communication session prompt to the user 802 via the user computing device 804 and/or the user computing device 822. In addition or alternatively, the strategic servicing device 814 may provide a merge communication session prompt to the customer service representative(s) via the customer service terminal 820 and/or the customer service terminal 832. The merge communication session prompt may be provided as an audio output (e.g., via a speaker in the user computing device 822 and/or 804), a visual output (e.g., a graphical user interface (GUI) button, a text message request), and/or any other output from a user output device included in the user computing device 804, the user computing device 822, the customer service terminal 820, and/or the customer service terminal 832 that would apparent to one of skill in the art in possession of the present disclosure.

In some embodiments, whether to provide a merge communication session prompt to the user and/or a customer service representative may be based on the information used to determine the user score and/or channel score satisfying a merge communication session prompt condition. For example, presentment of the merge communication session prompt at the customer service terminal 112 may be based on hours of operation 212, an estimated wait time determined by the EWT engine 214, loss propensity, based on a preferred user status associated with the user, as a percentage of interactions during the day (e.g., offer merging capabilities to 10% of interactions in a day), and/or any other information that would be apparent to one of skill in the art in possession of the present disclosure. Similarly, prompt conditions may exist that need to be satisfied before a merge communication session prompt is provided to the user device 102/804 and/or 104/824. For example, if the user 802 is proximal to the user computing device 822 as determined by the communication session 824 that is active versus relatively remote to the laptop provided by the user computing device 804, then the merge communication session prompt may be provided to the user via the user computing device 822 rather than the user computing device 804.

Figure 9:
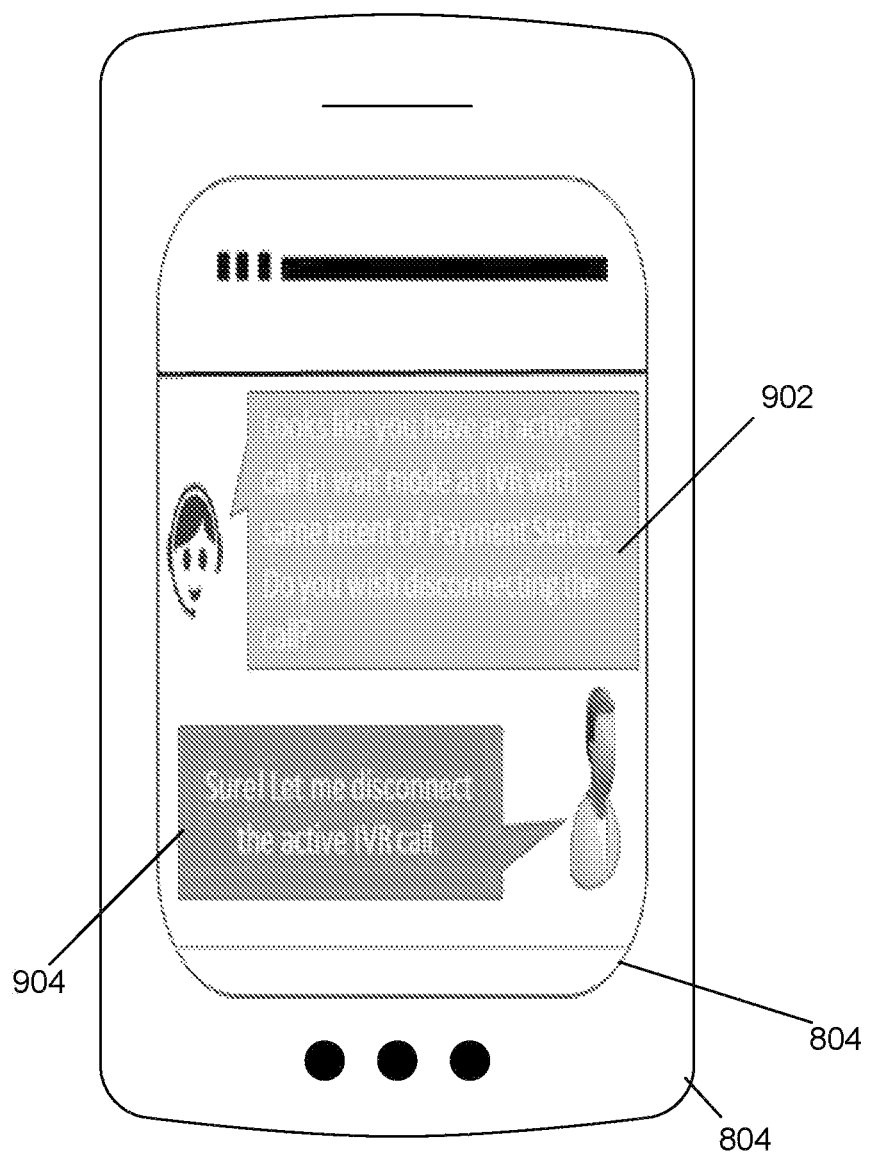
FIG. 9 is a screen shot of an embodiment of a user computing device displaying a communication interface on the user computing device.

Referring to FIG. 9, a screenshot of an embodiment of the user computing device 804 displaying a communication interface such as the communication channel interface 816 provided on the user computing device 804 of FIG. 8 is illustrated. Upon receiving instructions from the strategic servicing device 814, the asynchronous message provider device 808 may provide to the communication channel interface 816 via the network 118 the merge communication session prompt as a communication 902 (e.g., a message). The user 802 may respond back via the communication 904 that the user wishes to merge the communication sessions identified in the communication 902, and/in some embodiments that communication 902 may recommend the communication channel 828 as the communication channel to host the merged communication session. In other examples, upon receiving instructions from the strategic servicing device 814, the voice IVR device 826 may provide to the user computing device 822 a merge communication session prompt that may include an audio prompt to which the user 802 may respond verbally or respond using a keypad on the user computing device 822 with a response provided by the user 802 indicating merging or not merging the communication sessions on the specified communication channel.

Figure 10A:
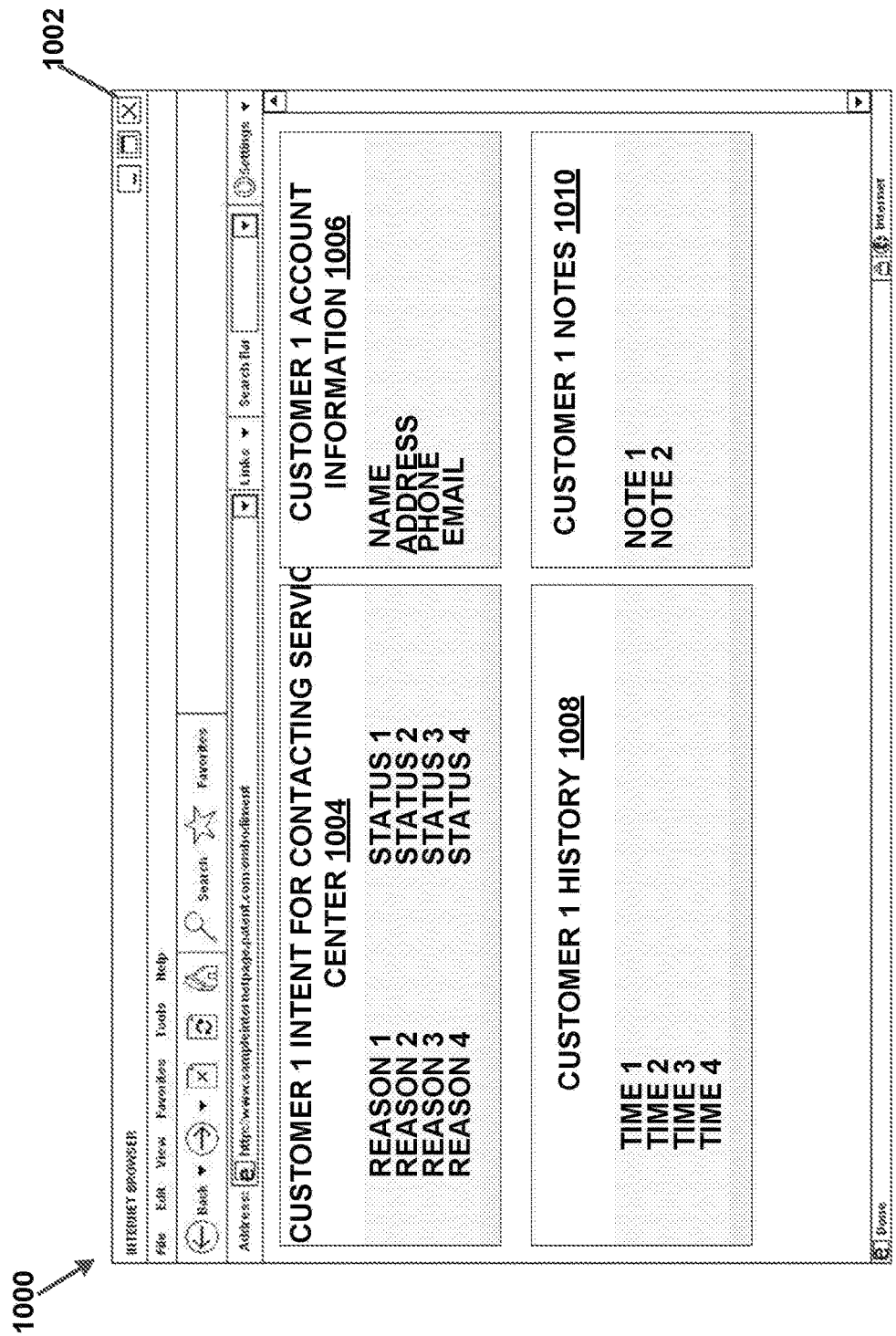
FIGS. 10A, 10B, and 10C are a screen shot of an embodiment of a customer service terminal displaying a communication interface on the customer service terminal.
Figure 10B:
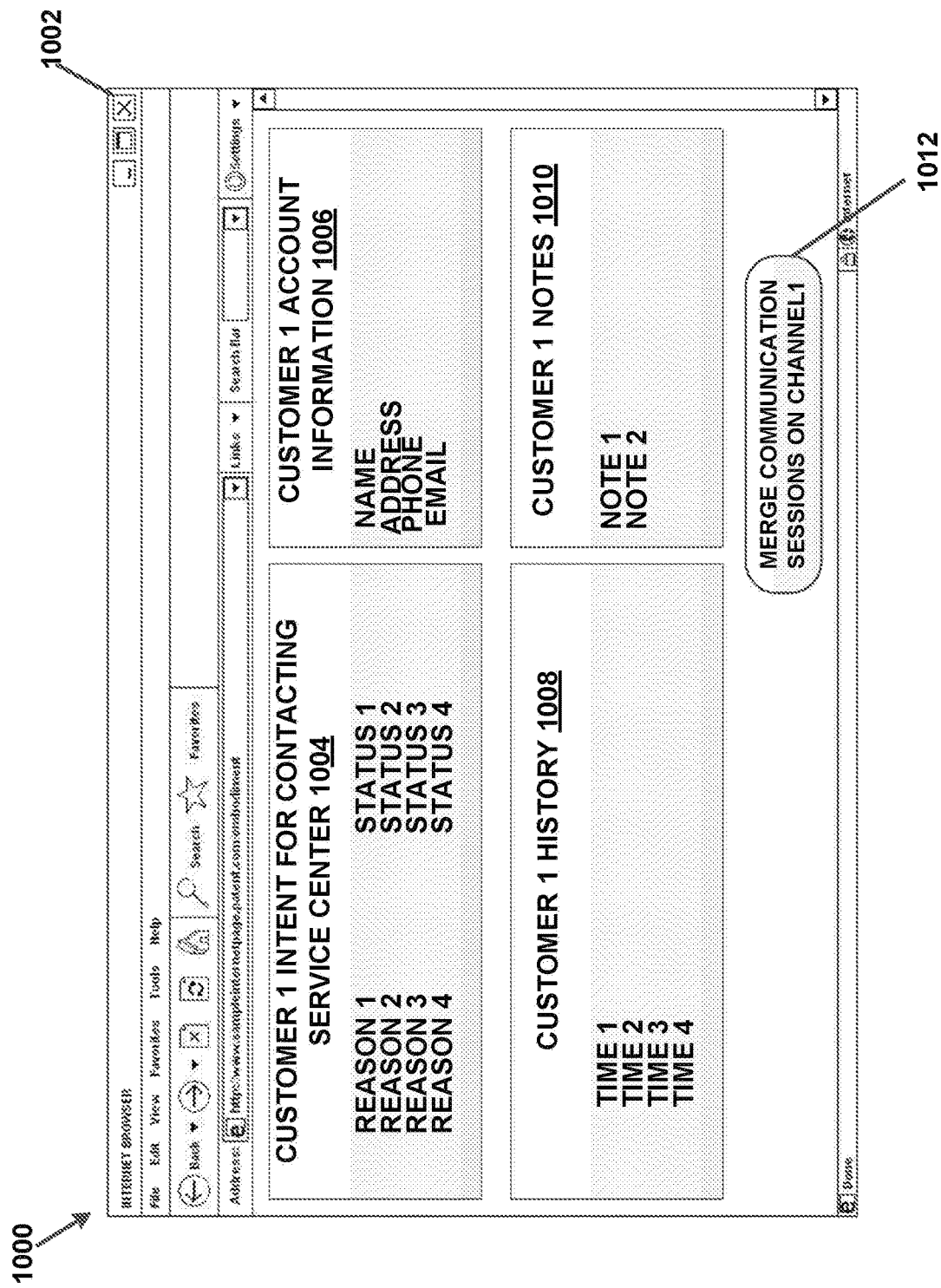
Figure 10C:
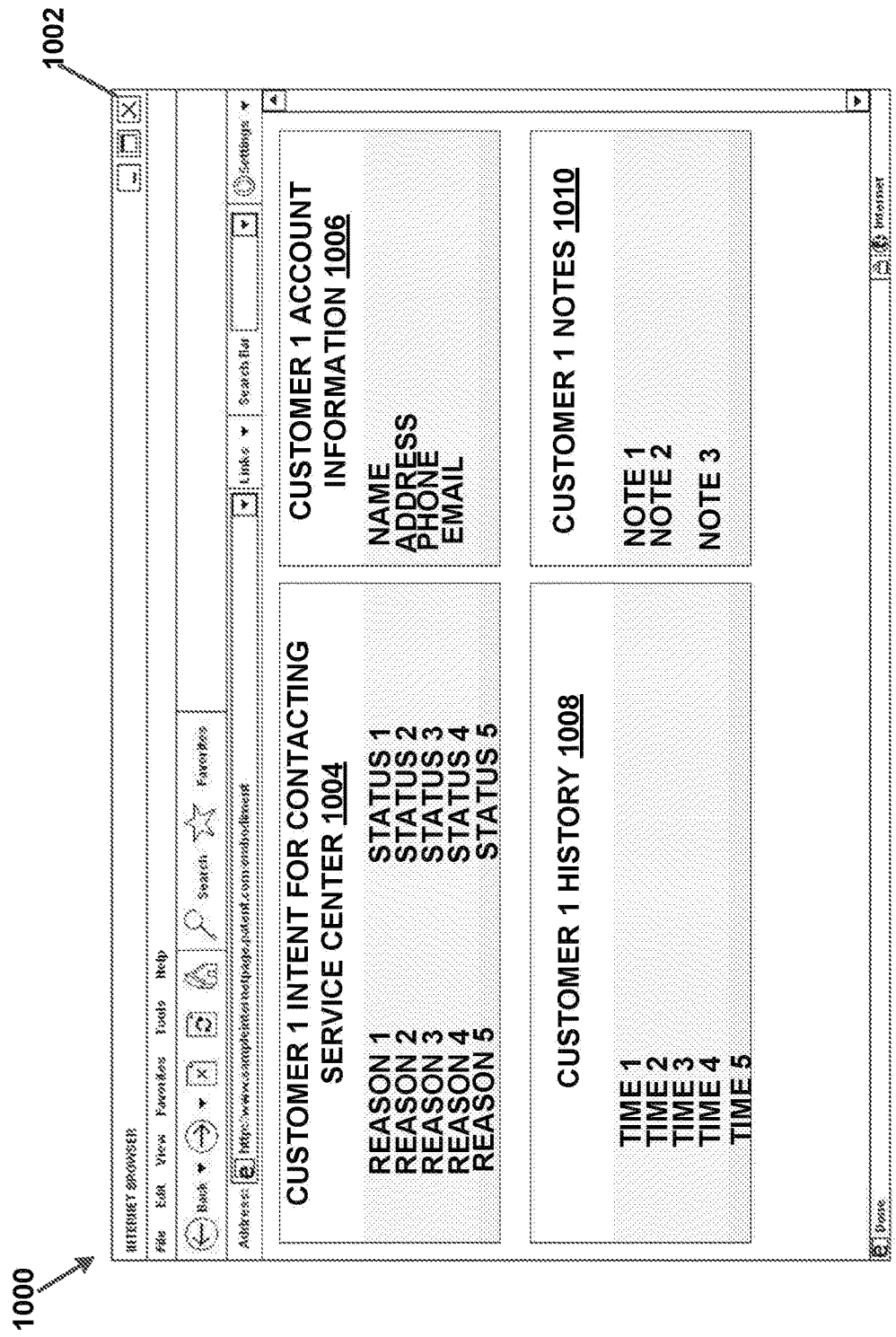

Referring to FIGS. 10A, 10B, and 10C, subsequent screen shots of an embodiment of a customer service terminal 112 displaying a customized customer service terminal GUI 1000 is illustrated. In the particular example illustrated in FIG. 10A, the customized customer service terminal GUI 1000 may include one or more customer service applications. The customer service applications may be provided via a web browser 1002 or other application graphical user interface apparent to one of skill in the art in possession of the present disclosure. Each application may include one or more sections (e.g., a section 1004, a section 1006, a section 1008 and a section 1010) that may include one or more editable fields and/or notification windows for instructions to be displayed or accessed. For example, the section 1004 may include a hierarchy of reasons/intents and status of the reasons/intents for a particular user establishing the communication session with the customer service representative based on the instructions provided by the strategic servicing device 114/200. Section 1006 of the customer service terminal GUI 1000 may include user account information of the user interacting with the customer service representative and associated with the service provider of the service provider device 106. Section 1008 may include recent history of user interactions with the service provider and/or the customer service platforms by the user including any active communication session on another communication channel. Section 1010 may include customer notes of previous interactions with the user associated with the user account and may be configured to allow the customer service representative to insert additional notes as the customer service representative interacts with the user of the user computing device 102 and/or 104. Although simplified and specific examples of the customer service terminal GUI 1000 are illustrated, one skilled in the art will recognize that many different configurations of the customer service terminal GUI 1000 and information displayed and received through the customer service terminal GUI 1000 will fall under the scope of the present disclosure.

After the user score satisfies a merge condition and the channel scores of the communication channels on which active communication session are provided indicate a preferred communication channel to host the merged communication session, the customer service terminal GUI 1000 may update such that the merge communication session prompt such as a button 1012 is displayed on the customer service terminal GUI 1000 as illustrated in FIG. 10B. In various embodiments, a button similar to the button 1012 may be displayed on the GUI of the user computing device 804 in FIG. 9 in addition to the button 1012 or alternatively to the button 1012. While not illustrated, additional information may be presented on the customer service terminal GUI 1000 in FIG. 10B that is associated with the merge communication session prompt that makes merging the communication session on a particular communication channel an option. Furthermore, the button 1012 may include an accept merge option and/or a decline merge option. If the customer service agent selects the button 1012 to accept the communication session merge, the customer service terminal GUI 1000 may update as illustrated in FIG. 10C such that the intent (e.g., "REASON 5") in section 1004 of the communication session that was merged with the communication session whose information was presented on the customer service terminal GUI 1000 is now also present. Similarly, any notes (e.g., "NOTE3") in section 1010 or any other information from the communication session that is merged with the original communication session presented on the customer service terminal GUI 1000 is now present, such that the customer does not need to duplicate any previous notes or details provided through the other communication session.

As discussed in the examples in FIGS. 9 and 10 the user and/or the customer service representative may have an option to decline the merge communication session prompt. If the user and/or the customer service representative declines the merge communication session prompt by providing a decline merge communication response to the strategic servicing device 200/814, the method 700 may end. The strategic servicing device 200/814 may use the decline merge communication response to update the strategic servicing engine 204 using a machine learning algorithm to more accurately calculate the user score and/or channel score for the particular user for subsequent communication sessions.

While block 710 of method 700 discusses calculating a channel score for each communication channel, one of skill in the art in possession of the present disclosure will recognize that block 710 may be optional and that in the event that the user score satisfies a merge condition in decision block 708 the merged communication session may be generated, as discussed below, and be provided on a predetermined communication channel, a randomly selected communication channel, and/or other communication session channel selection method that does not involve calculating a channel score that would be apparent to one of skill in the art in possession of the present disclosure. For example, the merge communication prompt may provide an option to the user and/or customer service representative as to which communication channel (e.g., the communication channel 809 or the communication channel 828 in the example of FIG. 8) to select to host the merged communication session. The user may select the communication channel on which the user wishes to continue.

The method 700 then proceeds to block 712 where the merged communication session is provided on the selected communication channel and block 714 where the communication channel that was not selected is terminated. In an embodiment, at block 712, the channel merging engine 216 may cause the merged communication session to be provided on the communication channel that was selected to host the merged communication session. While in block 714, the channel merging engine 216 may terminate or end the communication channel that was not selected. In an embodiment, at block 712, the channel merging engine 216 may merge the first communication session into the second communication session to form the merged communication session. The merging may include the channel merging engine 216 combining at least a portion of the communication session information that is associated with the communication session that is provided on the communication channel that is being terminated with the communication session information of the communication session that is not being terminated such that the merged communication session information includes the communication session information of both communication channels. In other embodiments, merging a first and second communication session may comprise generating a new communication session (e.g., a third communication session) that includes the communication history (e.g., communications such as texts, voice transcripts, etc.) included in the communication history 234 for each of the first communication session and the second communication session, information associated with each communication session that is stored in the channel interactions logs 236 (e.g., intents, etc.), and/or other communication session information for the first communication session and the second communication session that would be apparent to one of skill in the art in possession of the present disclosure.

As such and as used herein, the merged communication session may be the first communication session merged into the second communication session by adding some or all of the first communication session information with the second communication session information to create merged communication session information. No other changes may occur to the second communication session that receives the first communication session info (e.g., a communication session identifier for the second communication session may be maintained). In other embodiments, the merged communication session may be a third communication session that is created by combining at least a portion of the first communication session information with at least a portion of the second communication session information. The third communication session may have a third communication session identifier that is different than a first communication session identifier for the first communication session and a second communication session identifier.

During the merging of the first communication session and the second communication session authentication information may be shared such as an authentication token created for one or more first and second communication session. In some embodiments, the user may have been authenticated for one of the communication sessions and not the other. During the merging of the first communication session with the second communication session, the strategic servicing engine 204 may obtain the authentication token from the communication session whose communication channel is not hosting the merged communication session and use that authentication token to authenticate the user for use of the communication channel that is going to host the merged communication session and where user authentication has not taken place. As such, the user may not have to reauthenticate when the merging occurs. For example, if a first communication channel (e.g., IVR and its metadata) is being merged to a second communication channel (e.g., a chatbot) then authentication tokens from the first communication channel will be merged with the information of the second communication channel so that the user does not have to be reauthenticated at second communication channel if authentication has not taken place. In other embodiments, the authentication tokens, authentication identifiers, and/or other authentication information may be used to the link the first communication session and the second communication session when forming the merged communication session.

Figure 11:
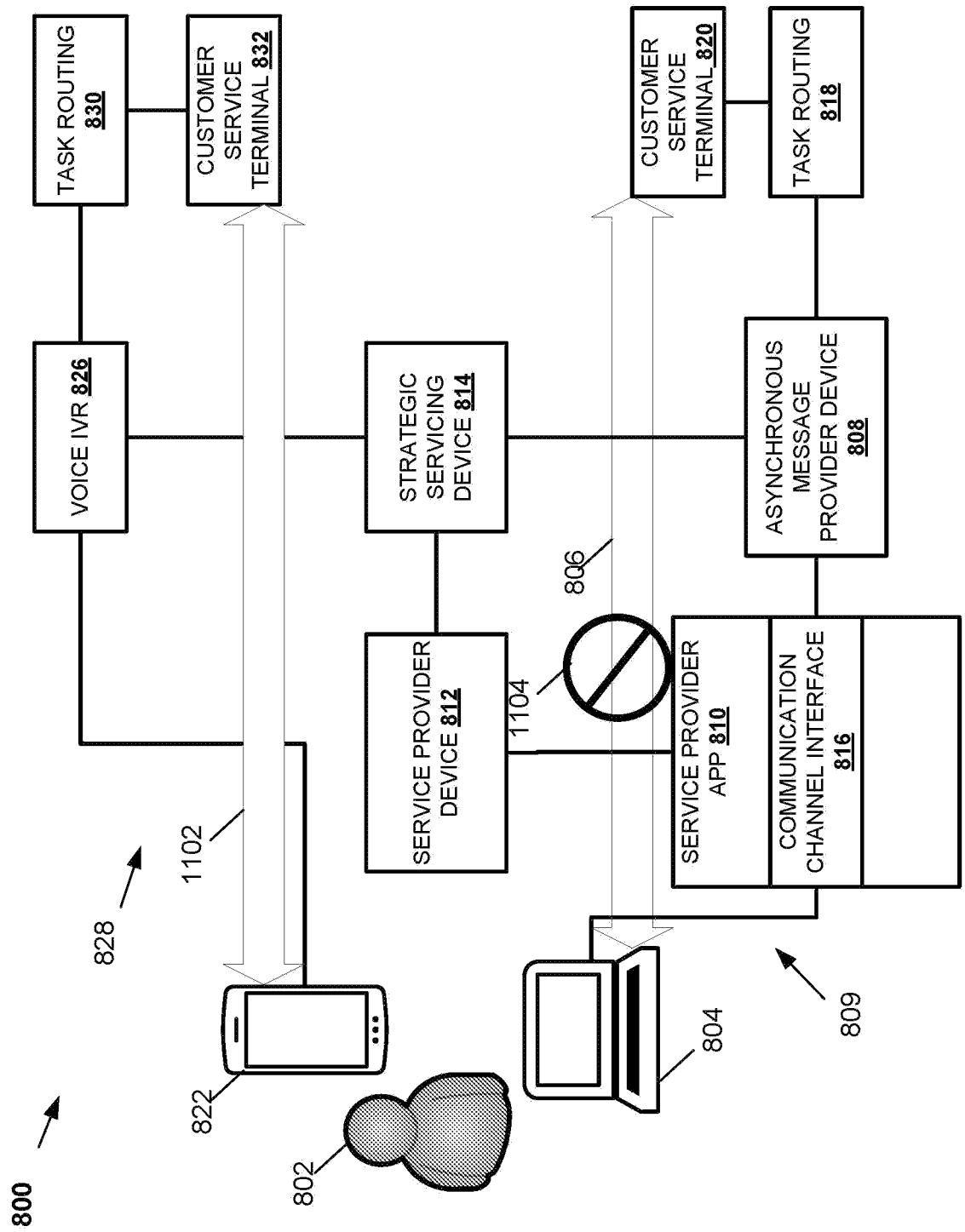
FIG. 11 is a block diagram illustrating an embodiment of the communication channel merging system of FIG. 8 during the method of FIG. 7.

Continuing with the example above and with reference to FIG. 11 (that may be the example communication channel merging system block diagram 800 of FIG. 8), the strategic servicing device 814 may determine that the communication sessions 806 and 824 are to be merged into a single communication session automatically or based on the instructions provided by the user 802 and/or a customer service representative of the customer service terminal 820 and/or 832. In some embodiments, the strategic servicing device 814 may also determine that the merged communication session is to be provided on the communication channel 828 and not the communication channel 809 based on channel scores for the communication channels 809 and 828. The strategic servicing device 814 may provide instructions along with the communication session information associated with the communication session 806 on the communication channel 809 to the voice IVR device 826—instructing the voice IVR device 826 to combine the communication session information associated with the communication session 806 with the communication session information associated with the communication session 824 to form a merged communication session 1102. In the illustrated example, the merged communication session may maintain the communication session identifier for the communication session 824 such that the merged communication session 1102 is the communication session 824 but with the merged communication session information that includes the communication session information for the communication session 824 and at least a portion of the communication session information for the communication session 806. The strategic servicing device may update the channel interaction log 236 such that the communication session 806 is inactive and cause the asynchronous message provider device 808 to inactivate the communication channel 809 as indicated by 1104.

In various embodiments of the method 700, the strategic servicing device 114/200 may predict, based on actions associated with the user while the user has established the first communication session and the second communication session, that the user will initiate a third communication session via a third communication channel. For example, the user 802 may be performing actions on the service provider application 810 detected by the service provider device 812 that indicate that the user 802 may be attempting to open up a communication session in addition to the communication sessions 806 and 824. The service provider device 812 may provide these action to the strategic servicing device 814 that then determines that the user 802 is like to initiate a third communication session. This information may be used to update the user score such that the communication session 806 and the communication session 824 are merged prior to the third communication session being established on the third communication channel. As an incentive to merge the communication sessions 806 and 824 and not initiate the third communication session, the strategic servicing device 814 may bump the user's merged communication session up in a queue such that the user's wait time on the merged communication session is not as long as either the wait time for the first communication session or the wait time for the second communication session to be processed. This may prevent use of resources on the third communication session especially when the first communication session and the second communication session appear to have the same intent/contact reason.

In other examples, even before the second communication session is established, the strategic servicing device 114/200 may determine/detect that the user is about to establish a second communication session via a second communication channel while the first communication session and its first communication channel are active. For example and with reference to FIG. 8, the user 802 may be connected with the voice IVR 826 via the user computing device 822 and the strategic servicing device 814 may detect that the user is interacting with the service provider device 812 via the user computing device 804. The user may be searching help topics on the service provider device 812 or be searching for customer service contact information. This may indicate that the user 802 may be trying establish another communication session on another communication channel than the communication channel 828 with the voice IVR 826. In order to prevent the second channel from being initiated, the strategic servicing device 114/200 may attempt to lower the wait time for the first communication session to be serviced in exchange that the user does not initiate the second communication session on the second communication channel. For example, the strategic servicing device 114/200 may provide an option or prompt to the user via the first communication session and the user computing device 102 and/or 104 to lower the wait time. If the user selects the option or prompt, the strategic servicing device 114/200 may move the first communication session up in the queue—reducing the wait time, which may cause the user to discontinue initiation of the second communication session on a second communication channel. In other examples, the strategic servicing device 114/200 may attempt to lower the wait time on any merged communication session that is established such that the wait time for the merged communication session is less than the wait time of both first and second communication sessions.

Thus, a system and method for merging communication channels and communication sessions between a user and one or more communication provider service devices has been described. A strategic servicing device may determine a user score that determines whether to merge the communication channels and communications sessions if the user score satisfies a merge condition. If the user score satisfies a merge condition, the strategic servicing device may calculate channel scores for the communication channels and determine which of the active communication channels to provide the merged communication session. Prompts may be provided to the user and/or a customer service representative to initiate the merge of the communication sessions and communication channels. As such, system resources may be conserved providing a more efficient customer service system and experience for the user.

Figure 12:
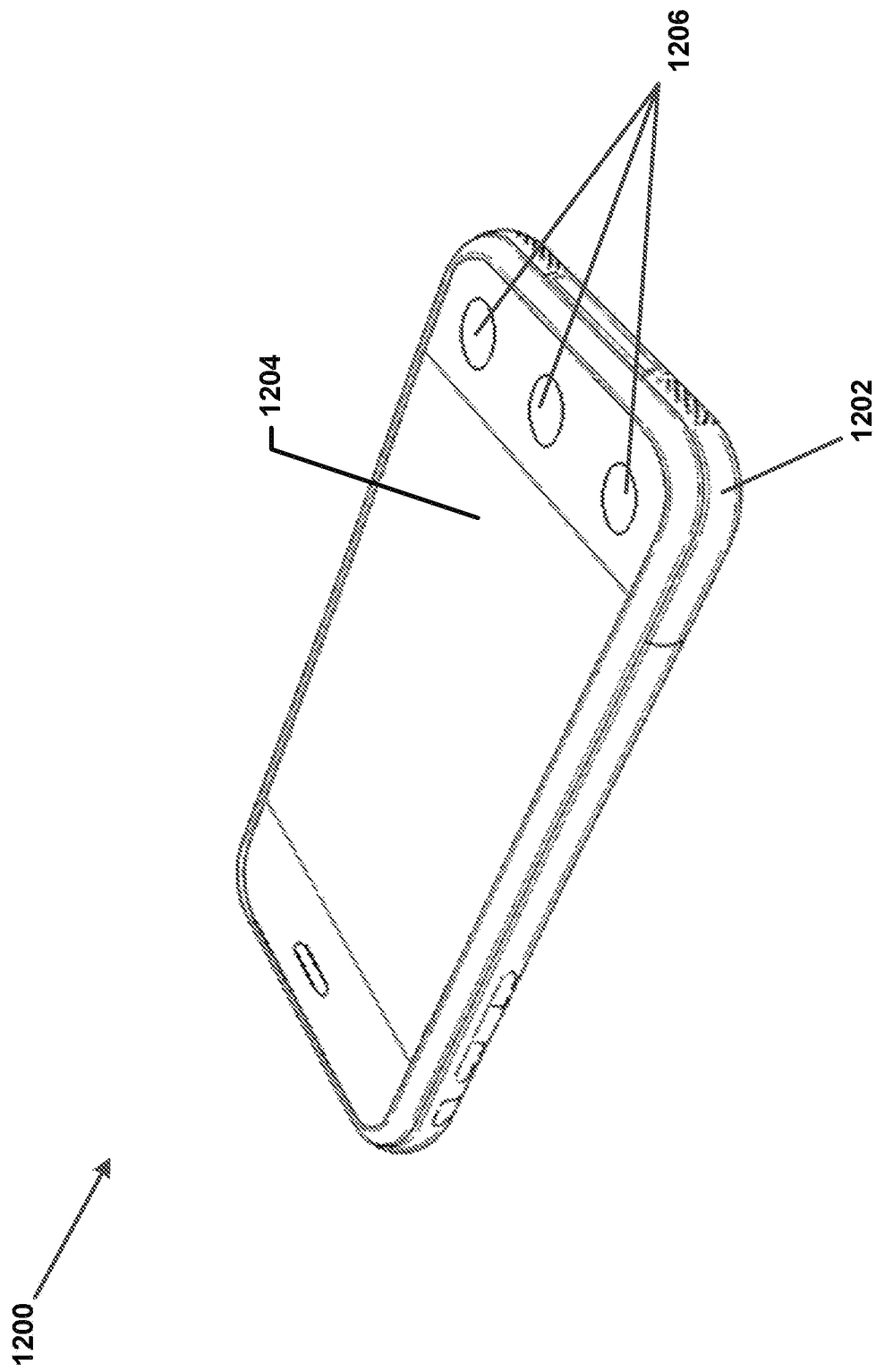
FIG. 12 is a perspective view illustrating an embodiment of a user computing device.

Referring now to FIG. 12, an embodiment of a user computing device 1200 is illustrated. The user computing device 1200 may be any of the user computing devices discussed above. The user computing device 1200 includes a chassis 1202 having a display 1204 and an input device including the display 1204 and a plurality of input buttons 1206. One of skill in the art will recognize that the user computing device 1200 is a portable or mobile phone including a touch screen input device and a plurality of input buttons that allow the functionality discussed above with reference to the method 700. However, a variety of other portable/mobile devices and/or desktop devices may be used in the method 700 without departing from the scope of the present disclosure.

Figure 13:
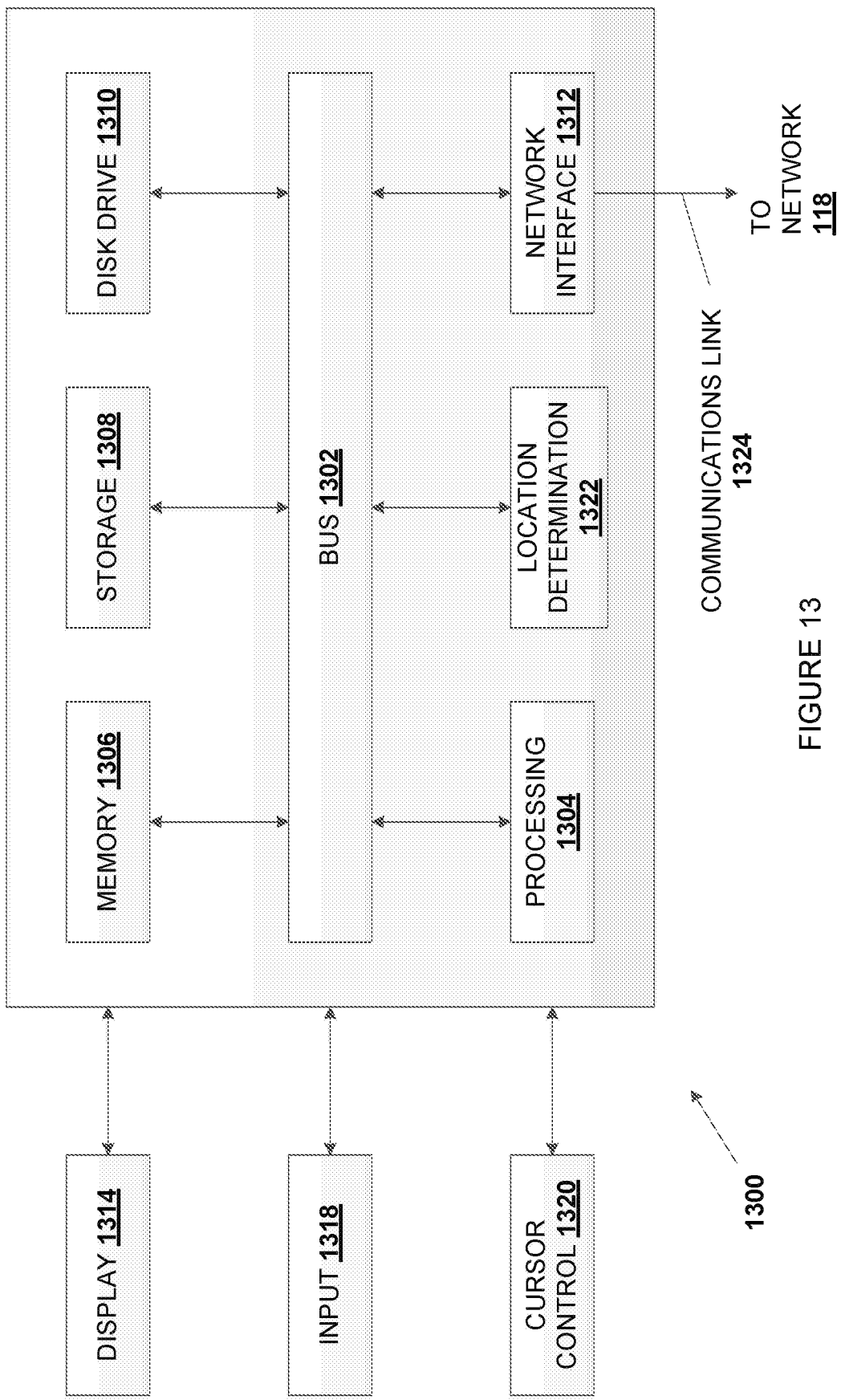
FIG. 13 is a schematic view illustrating an embodiment of a computer system.

Referring now to FIG. 13, an embodiment of a computer system 1300 suitable for implementing, for example, the user computing devices, the customer service terminals, the service provider devices, the strategic services devices, the communication provider service devices, and/or the strategic servicing database is illustrated. It should be appreciated that other devices utilized in the communication channel merging system 100 discussed above may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), and/or a location determination component 1322 (e.g., a Global Positioning System (GPS) device as illustrated, a cell tower triangulation device, and/or a variety of other location determination devices known in the art.) In one implementation, the disk drive component 1310 may comprise a database having one or more disk drive components.

In accordance with embodiments of the present disclosure, the computer system 1300 performs specific operations by the processor 1304 executing one or more sequences of instructions contained in the system memory component 1306, such as described herein with respect to the user computing devices, the customer service terminals, the service provider device, the strategic servicing device, the communication provider service device, and/or the third-party databases. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, DVD, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 118 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
detecting two or more concurrent communication sessions between a user and a provider, each of the two or more concurrent communication sessions being conducted over a different communication interface and over a different communication channel;
determining, based on information associated with the two or more concurrent communication sessions, that the two or more concurrent communication sessions should be merged;
merging the two or more concurrent communication sessions into a merged communication session; and
providing the merged communication session on one of the two or more concurrent communication channels.

2. The system of claim 1, wherein the operations further comprise terminating, upon providing the merged communication session, a remaining one or more communication channels that is not providing the merged communication session.

3. The system of claim 1, wherein the information associated with the two or more concurrent communication sessions include information about the user, system logs, system configurations, a communication history, and channel interaction logs.

4. The system of claim 1, wherein providing the merged communication session on the one of the two or more concurrent communication channels comprises selecting the one of the two or more concurrent communications channels.

5. The system of claim 4, wherein the one of the two or more concurrent communications channels is selected based on the information associated with the two or more concurrent communication sessions.

6. The system of claim 1, wherein the operations further comprise:
providing, in response to the determining that the two or more concurrent communication sessions should be merged, a merge request to at least one of the two different communication interfaces; and
receiving a merge acceptance response,
wherein the two or more concurrent communication sessions are merged into the merged communication session upon receiving the merge acceptance response.

7. The system of claim 1, wherein merging the two or more concurrent communication sessions into the merged communication session further comprises merging session data associated with each of the two or more concurrent communication sessions.

8. The system of claim 1, wherein the two or more concurrent communication sessions include at least two of a live voice session, a chat bot session, an interactive voice response (IVR) system session, or a customer service website session.

9. A non-transitory machine-readable medium having stored thereon machine-readable instructions executable to cause performance of operations comprising:
detecting two or more concurrent communication sessions between a user and a provider, each of the two or more concurrent communication sessions being conducted over different communication interfaces and over a different communication channel;
determining, based on information associated with the two or more concurrent communication sessions, that the two or more concurrent communication sessions should be merged;
generating a channel score for each of the different communication channels based on information associated with the each of the different communication channels;
selecting one of the different communication channels based on the generated channel score;
merging the two or more concurrent communication sessions into a merged communication session; and
providing the merged communication session on the selected one of the different communication channels.

10. The non-transitory machine-readable medium of claim 9, wherein the operations further comprise terminating, upon providing the merged communication session on the selected one of the different communication channels, a remaining one or more communication channels that is not providing the merged communication session.

11. The non-transitory machine-readable medium of claim 9, wherein the information associated with the two or more concurrent communication sessions include information about the user, system logs, system configurations, a communication history, and channel interaction logs.

12. The non-transitory machine-readable medium of claim 9, wherein the information associated with the each of the different communication channels includes a type of communication channel and a network functionality.

13. The non-transitory machine-readable medium of claim 9, wherein the operations further comprise:
providing, in response to the determining that the two or more concurrent communication sessions should be merged, a merge request to at least one of the two different communication interfaces; and
receiving a merge acceptance response,
wherein the two or more concurrent communication sessions are merged into the merged communication session upon receiving the merge acceptance response.

14. The non-transitory machine-readable medium of claim 9, wherein merging the two or more concurrent communication sessions into the merged communication session further comprises merging session data associated with each of the two or more concurrent communication sessions.

15. The non-transitory machine-readable medium of claim 9, wherein the two or more concurrent communication sessions include at least two of a live voice session, a chat bot session, an interactive voice response (IVR) system session, or a customer service website session.

16. A method, comprising:
detecting two or more concurrent communication sessions between a user and a provider, each of the two or more concurrent communication sessions being conducted over a different communication interface and over a different communication channel;
determining, based on information associated with the two or more concurrent communication sessions, that the two or more concurrent communication sessions should be merged;
merging the two or more concurrent communication sessions into a merged communication session; and providing the merged communication session on one of the two or more concurrent communication channels.

17. The method of claim 16, further comprising terminating, upon providing the merged communication session, a remaining one or more communication channels that is not providing the merged communication session.

18. The method of claim 16, wherein the information associated with the two or more concurrent communication sessions include information about the user, system logs, system configurations, a communication history, and channel interaction logs.

19. The method of claim 16, wherein providing the merged communication session on the one of the two or more concurrent communication channels comprises selecting the one of the two or more concurrent communications channels based on the information associated with the two or more concurrent communication sessions.

20. The method of claim 16, further comprising:
providing, in response to the determining that the two or more concurrent communication sessions should be merged, a merge request to at least one of the two different communication interfaces; and
receiving a merge acceptance response,
wherein the two or more concurrent communication sessions are merged into the merged communication session upon receiving the merge acceptance response.

* * * * *